Oct. 4, 1966     H. T. ROBINSON     3,276,314
AUTOMATIC SLIDE PROJECTOR
Original Filed Feb. 23, 1962                    17 Sheets-Sheet 1
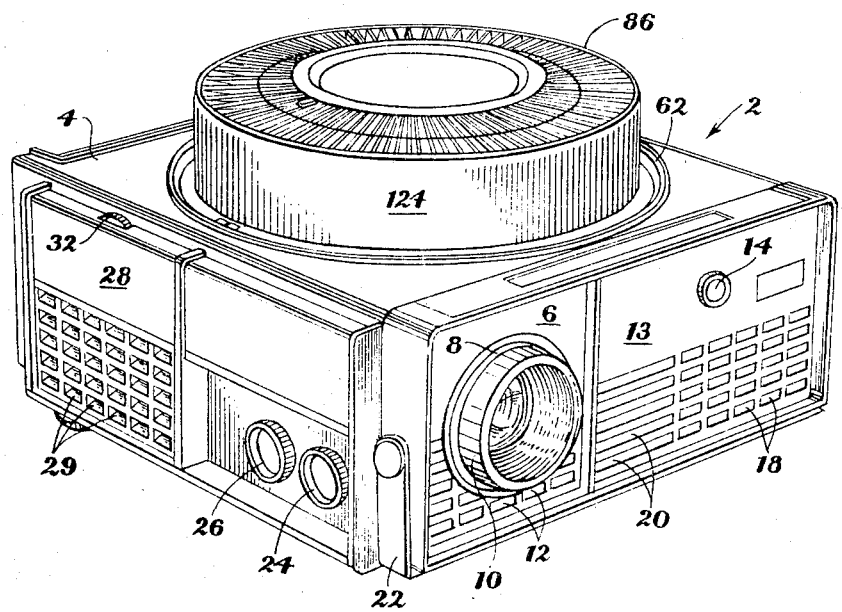
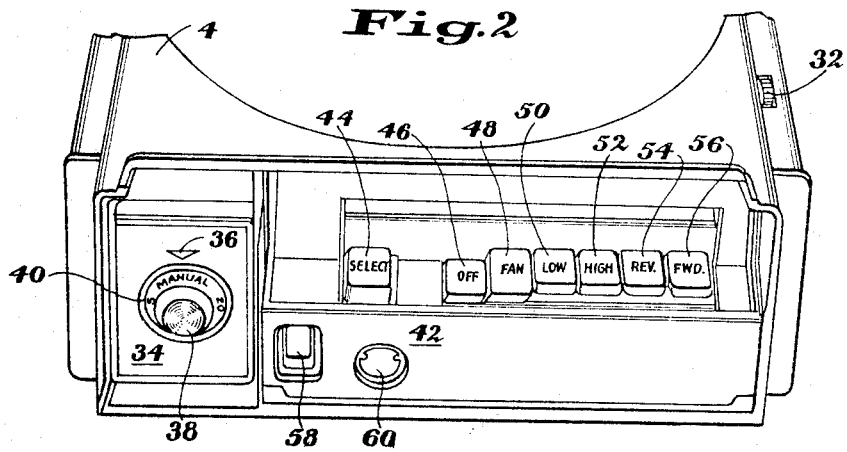
Herbert T. Robinson
INVENTOR.
BY R. Frank Smith
Steve W. Trembow
ATTORNEYS Oct. 4, 1966  H. T. ROBINSON  3,276,314
AUTOMATIC SLIDE PROJECTOR
Original Filed Feb. 23, 1962  17 Sheets-Sheet 2
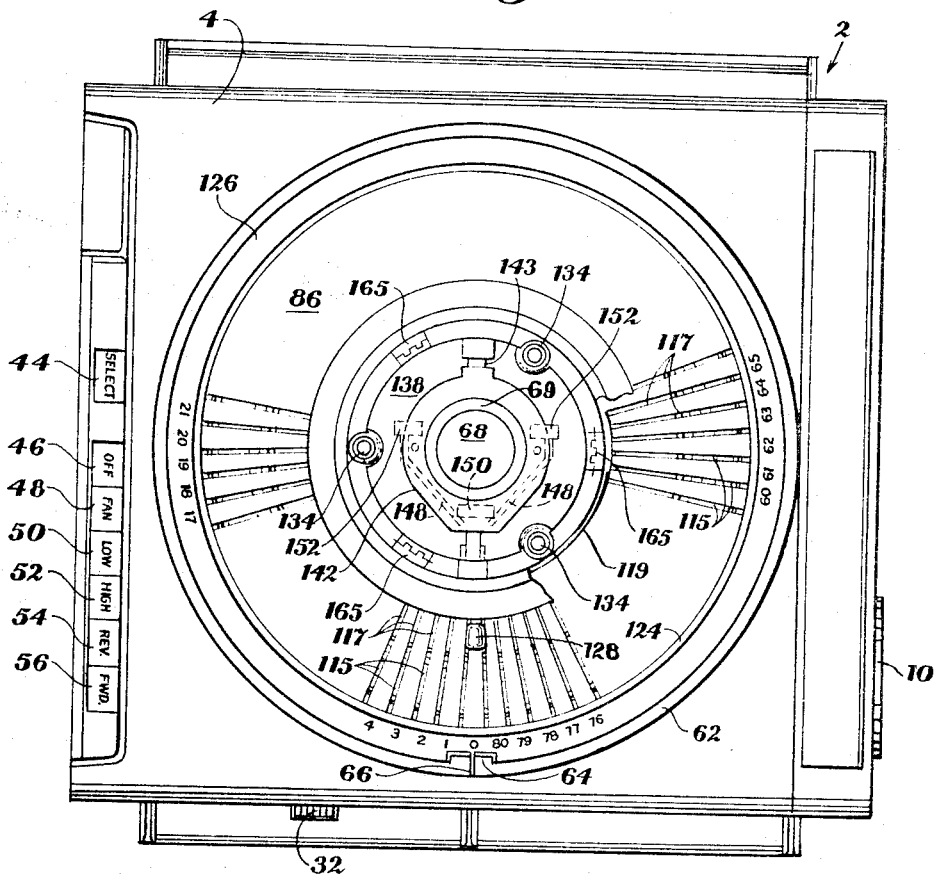
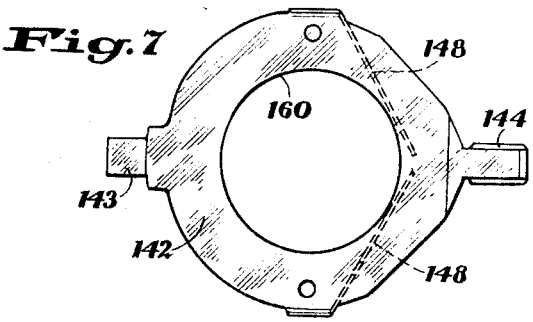
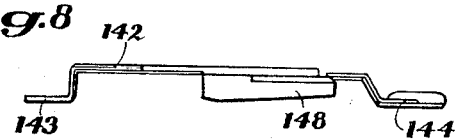
Herbert T. Robinson
INVENTOR.
BY
ATTORNEYS Oct. 4, 1966    H. T. ROBINSON    3,276,314
AUTOMATIC SLIDE PROJECTOR
Original Filed Feb. 23, 1962    17 Sheets-Sheet 3

Herbert T. Robinson
INVENTOR.

BY

ATTORNEYS

Oct. 4, 1966                H. T. ROBINSON                3,276,314
                        AUTOMATIC SLIDE PROJECTOR
Original Filed Feb. 23, 1962                         17 Sheets-Sheet 5

Herbert T. Robinson
INVENTOR.

BY

ATTORNEYS

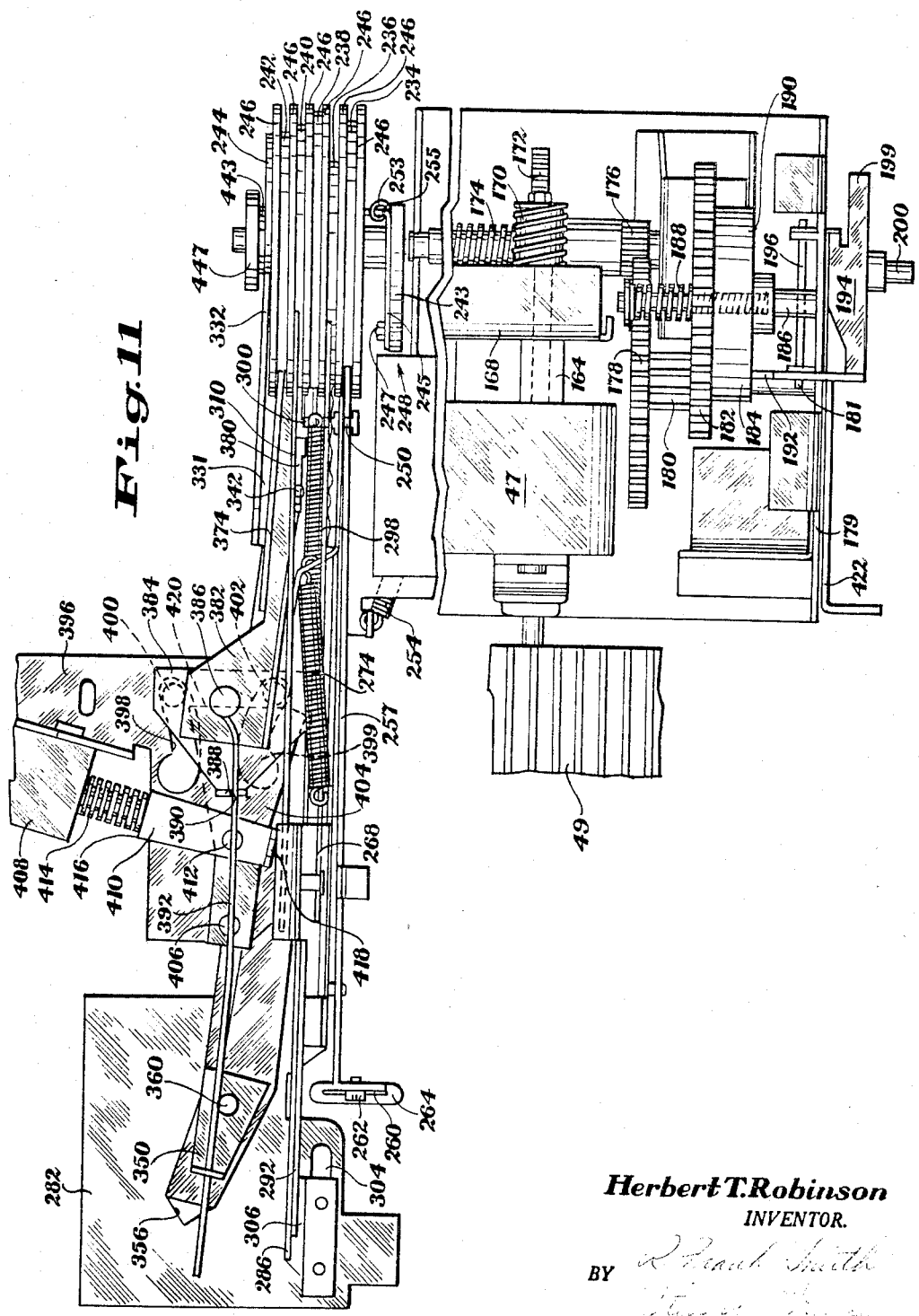

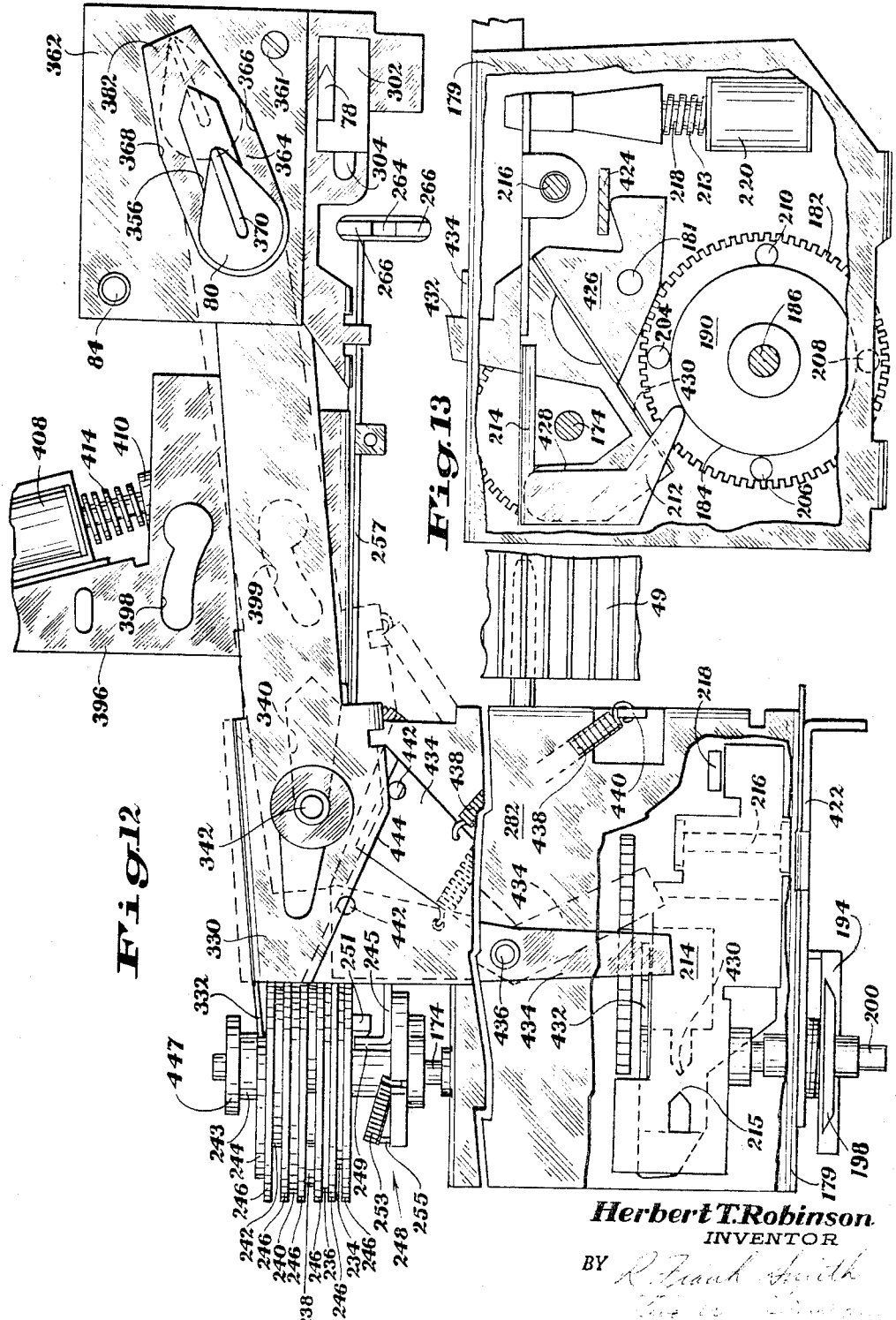

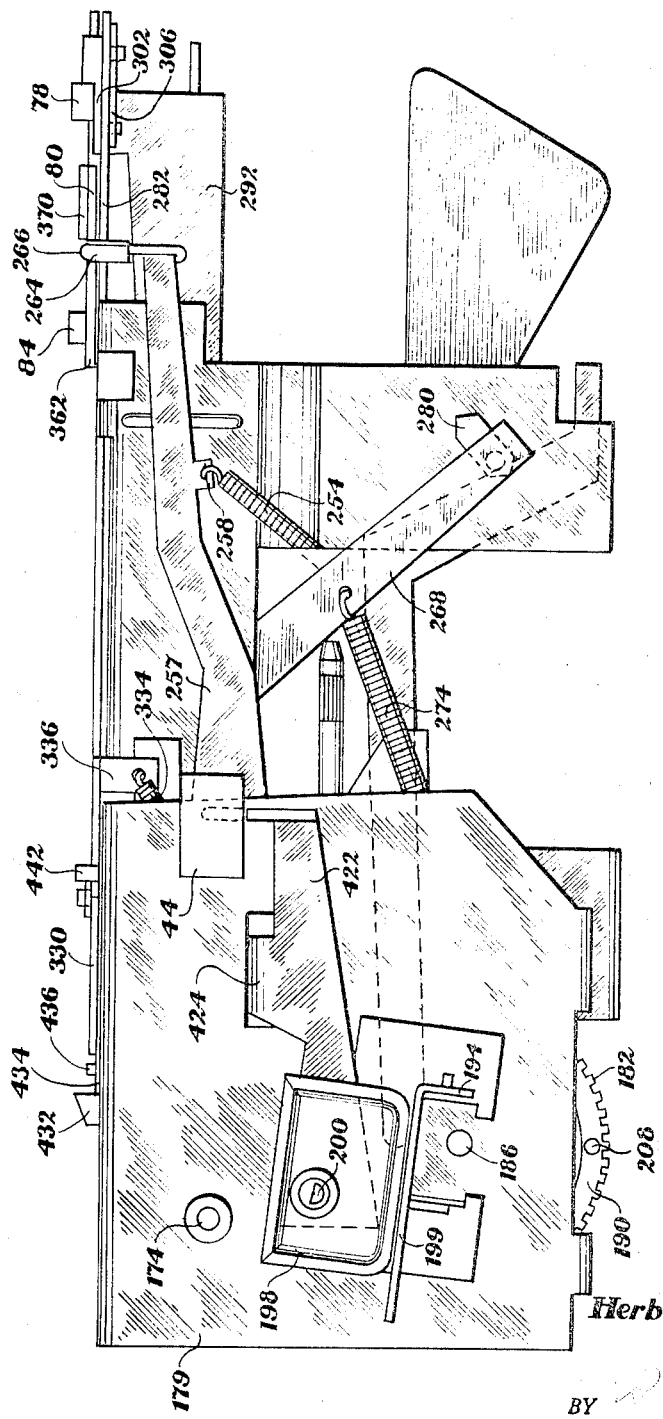

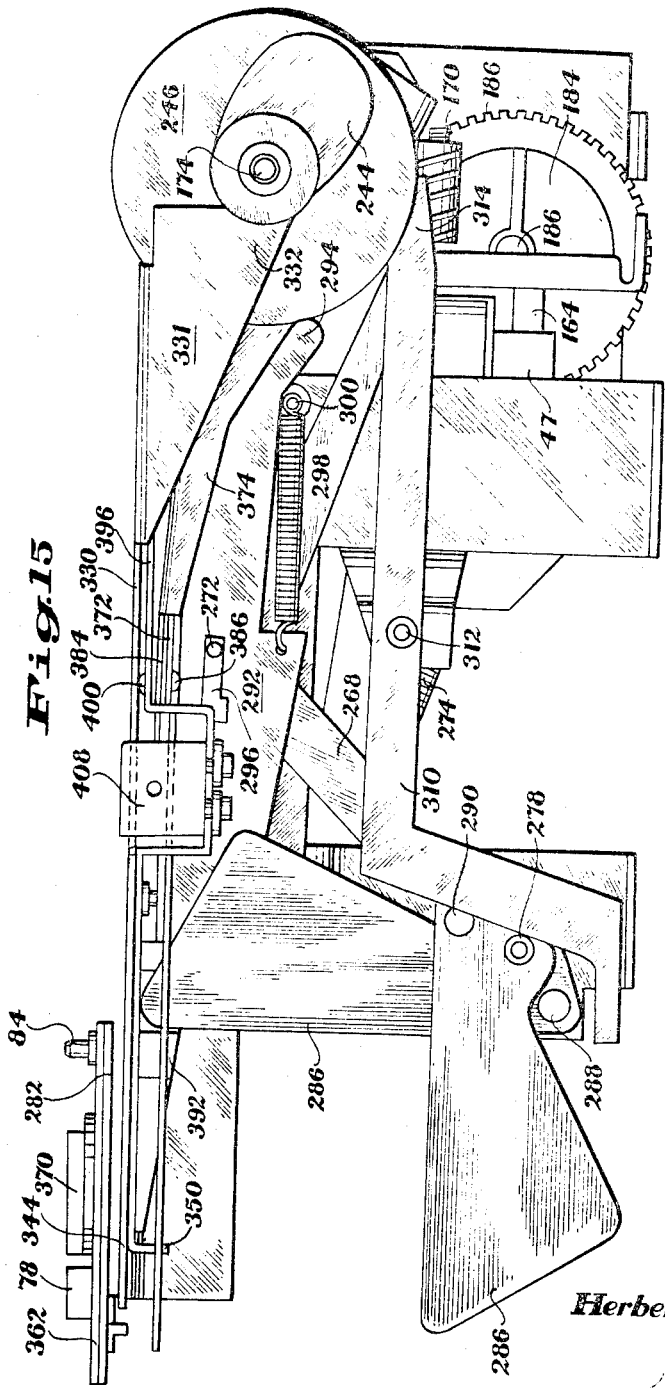

Oct. 4, 1966

H. T. ROBINSON 3,276,314

AUTOMATIC SLIDE PROJECTOR

Original Filed Feb. 23, 1962

Herbert T. Robinson
INVENTOR.

BY

ATTORNEYS

Herbert T. Robinson
INVENTOR.

BY

ATTORNEYS

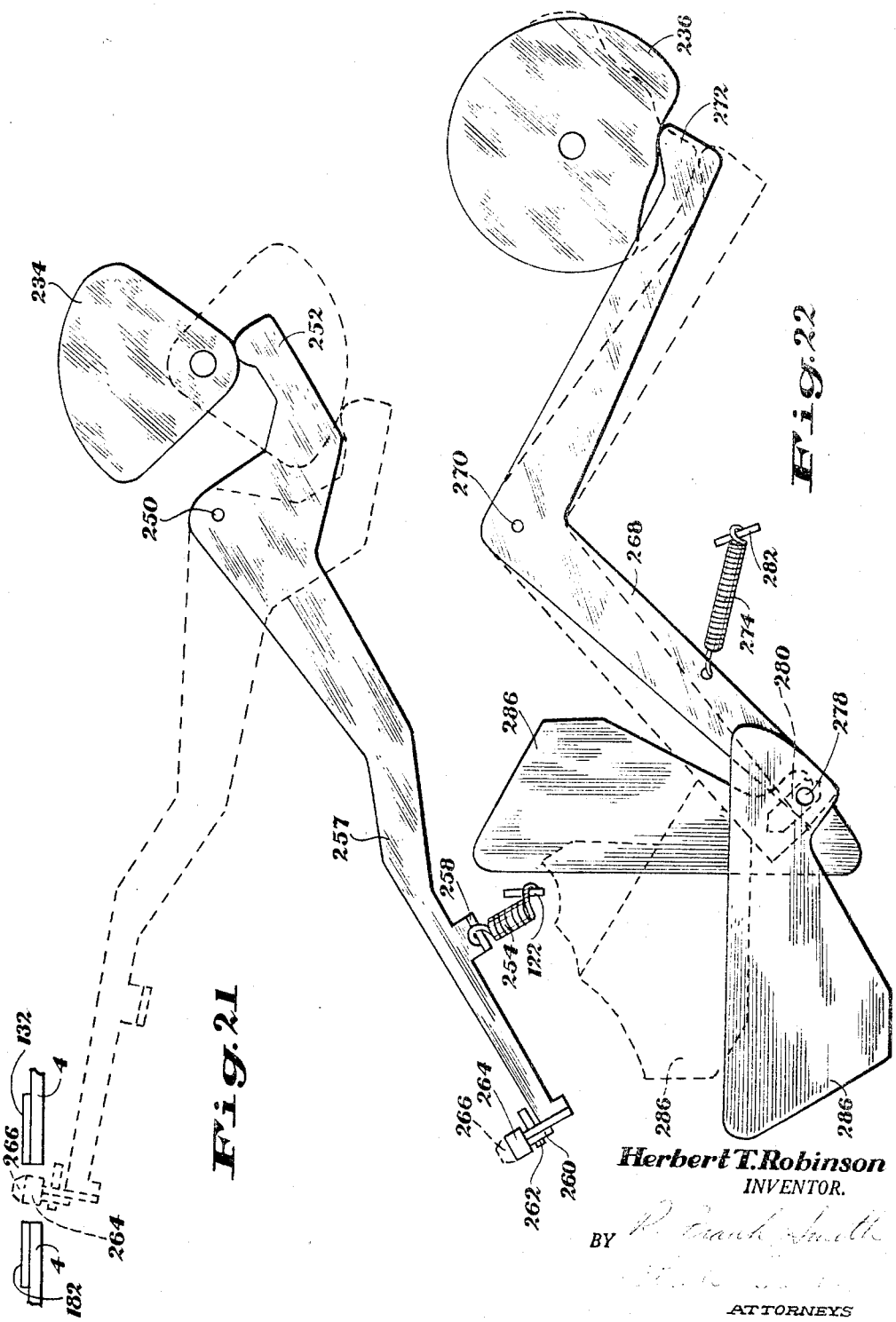

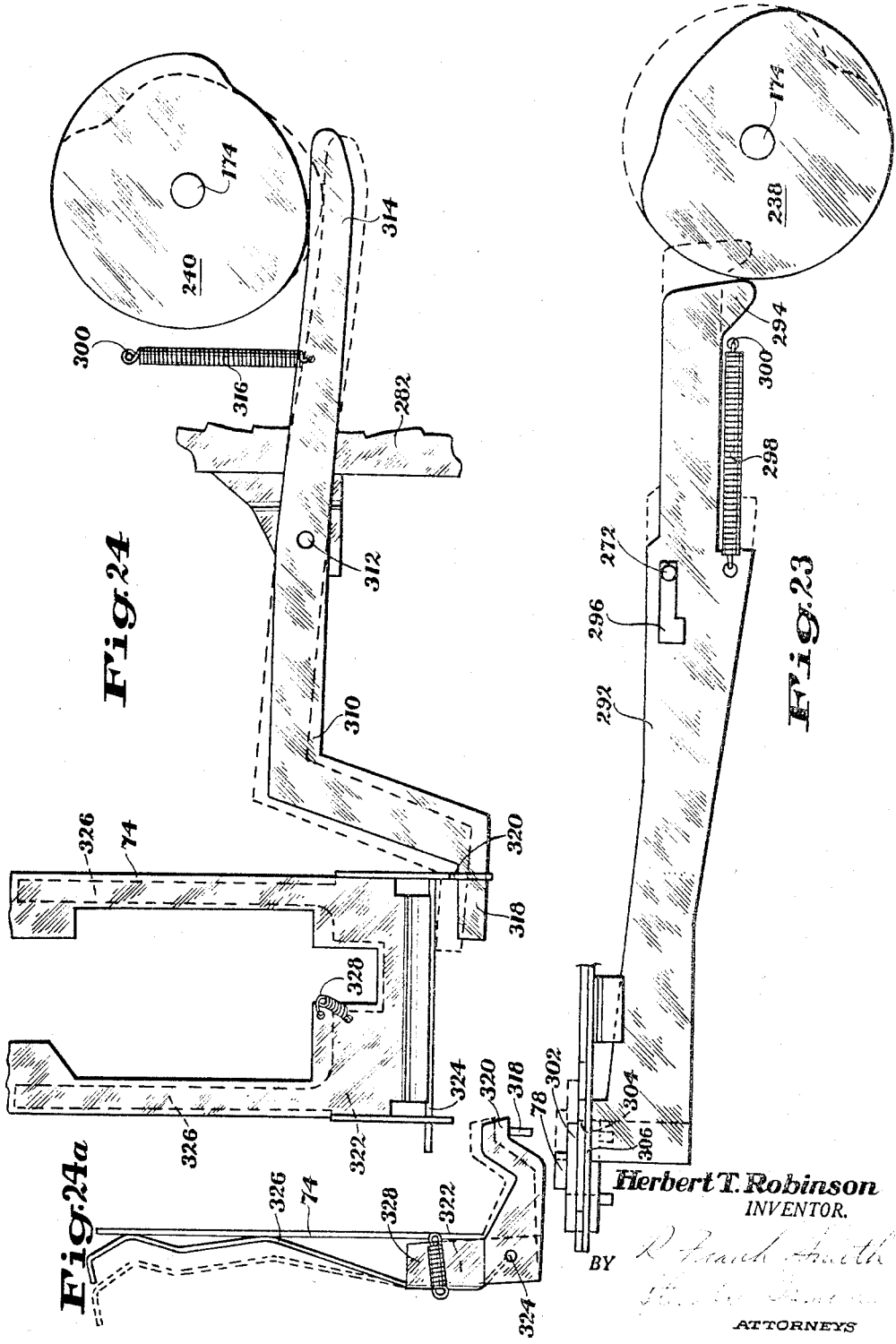

Oct. 4, 1966  H. T. ROBINSON  3,276,314
AUTOMATIC SLIDE PROJECTOR
Original Filed Feb. 23, 1962  17 Sheets-Sheet 15
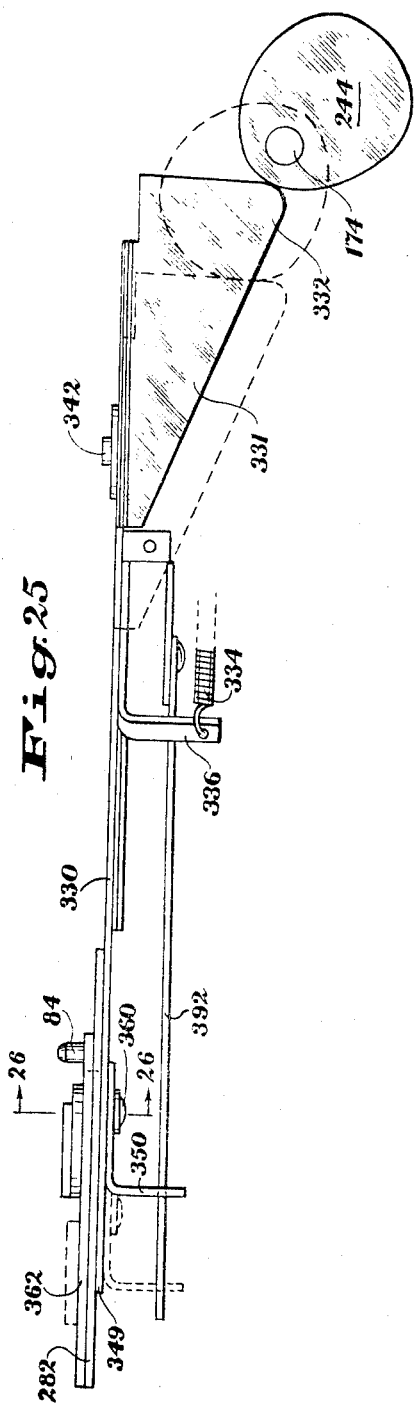
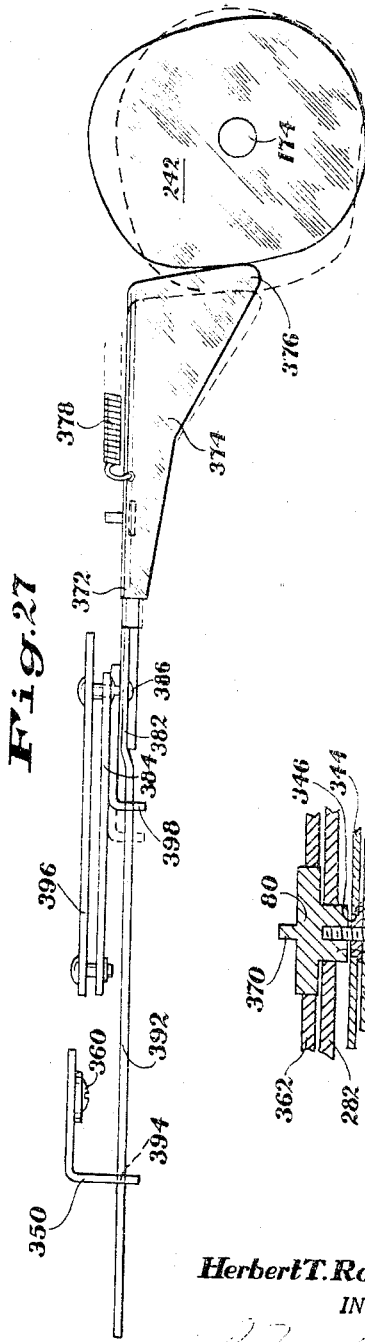
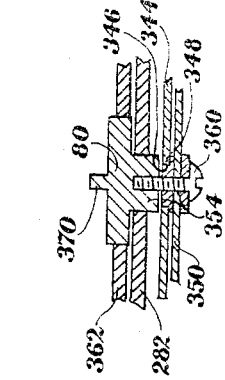
Herbert T. Robinson
INVENTOR.
BY
ATTORNEYS Oct. 4, 1966 H. T. ROBINSON 3,276,314
AUTOMATIC SLIDE PROJECTOR
Original Filed Feb. 23, 1962 17 Sheets-Sheet 16

Herbert T. Robinson
INVENTOR.

BY
ATTORNEYS

Oct. 4, 1966    H. T. ROBINSON    3,276,314
AUTOMATIC SLIDE PROJECTOR
Original Filed Feb. 23, 1962    17 Sheets-Sheet 17
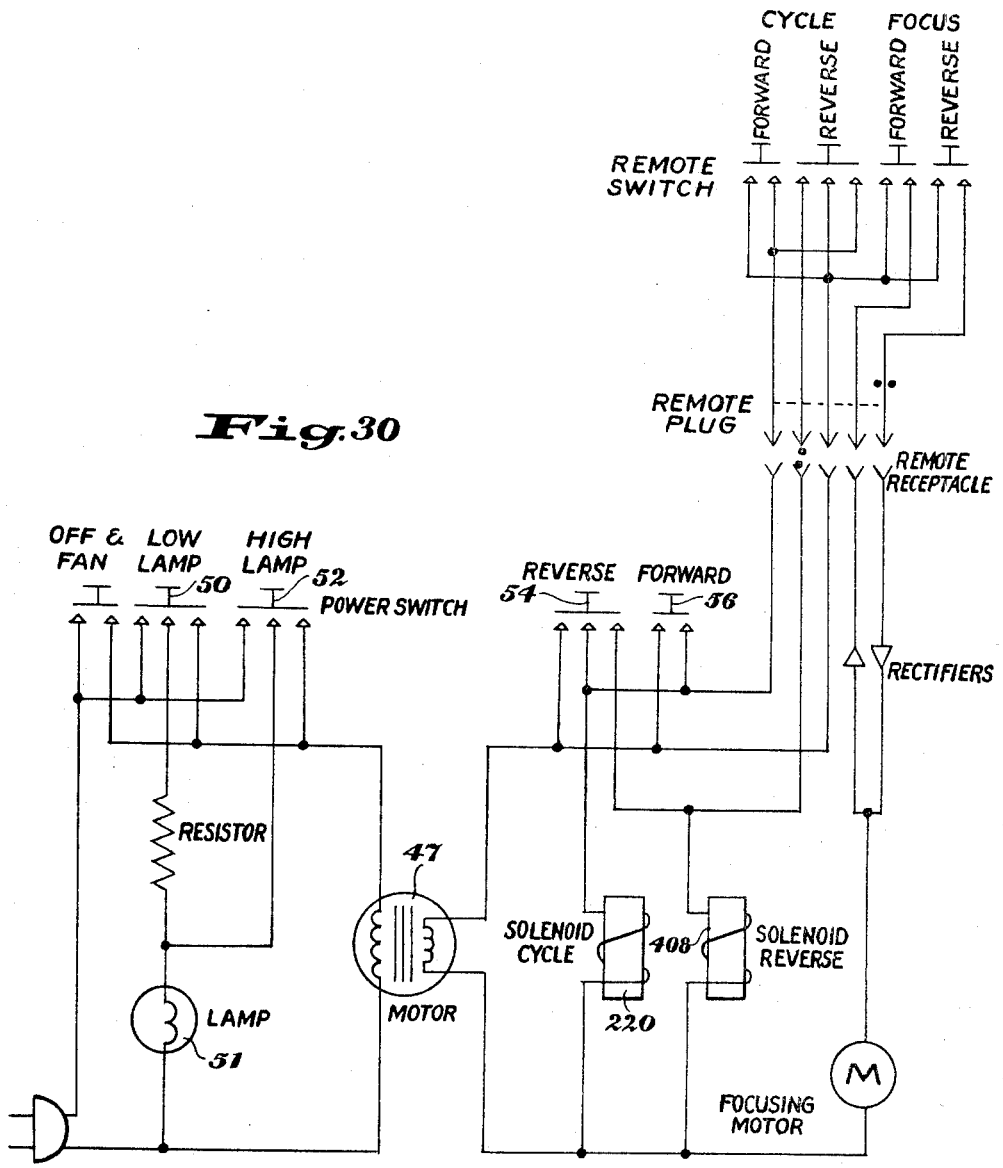
Herbert T. Robinson
INVENTOR.
BY
ATTORNEYS United States Patent Office 3,276,314
Patented Oct. 4, 1966

3,276,314
AUTOMATIC SLIDE PROJECTOR
Herbert T. Robinson, Rochester, N.Y., assignor to Eastman Kodak Company, Rochester, N.Y., a corporation of New Jersey
Original application Feb. 23, 1962, Ser. No. 175,216. Divided and this application June 1, 1965, Ser. No. 460,017
25 Claims. (Cl. 88—27)

This application is a division of U.S. patent application Serial No. 175,216 for an Automatic Slide Projector, filed on February 23, 1962, by Herbert T. Robinson.

This invention relates generally to slide projectors, and more specifically to an improved automatic slide projector selectively controlled by automatic or manual means.

One of the primary objects of the present invention is to provide an automatic slide projector that is jam-proof in operation.

Another object of this invention is the provision of an automatic slide projector having a vertical gravity slide feed means.

Still another object of this invention is the provision of a slide projector having a circular slide tray.

A more specific object of the invention is to provide an automatic slide projector having a circular slide tray mounted on top of the projector, and adapted upon rotation to feed the slides by gravity to the slide-viewing position.

A further object of the invention is to provide an improved slide projector having a slide tray mounted on the top thereof in an unobstructed position where it is easily accessible for slide editing and removal, and in which the slide compartment members and film gate index are in clear view at all times.

Still another object of the invention is the provision of an improved slide projector in which any slide therein may be edited at any time during projection.

A further object of the invention is to provide a slide projector that greatly simplifies the film transport means.

Still another object of the invention is the provision of an improved automatic slide projector having a simplified and improved editing system.

Another object of the invention is to provide a slide projector in which the slides may be edited in the slide tray directly, or the slide tray may be removed and individual slides fed manually into the projector for editing.

Still another object of the invention is to provide a slide projector having a circular slide tray adapted to accept glass, metal or plastic mounts of 1/10-inch thickness or less.

Objects and advantages other than those set forth above will be apparent from the following description when read in connection with the accompanying drawings, in which:

FIG. 1 is a perspective view of an automatic slide projector built in accordance with this invention;

FIG. 2 is a fragmentary, rear elevation perspective view of the projector of FIG. 1;

FIG. 3 is a top plan view of the slide projector of FIG. 1 with a slide tray mounted thereon;

FIG. 7 is a bottom view of the slide tray latch apart from the slide tray;

FIG. 8 is a side elevation view of the latch of FIG. 7;

FIG. 11 is an enlarged bottom view of one of the components shown in FIG. 10;

FIG. 12 is a top plan view of the component of FIG. 11 turned through an angle of 180°;

FIG. 13 is a segmental front elevation view of a portion of the component of FIG. 12 with a part of the wall broken away and a cam and portion of a lever omitted for purposes of clarity;

FIG. 14 is a front elevation view of the component of FIG. 12;

FIG. 15 is a rear elevation view of the component of FIG. 12;

FIG. 21 is a side elevation view of the cam and slide transport mechanism with the remaining structure omitted for purposes of clarity, and further showing its normal lowermost position in full lines and its uppermost position in dotted lines;

FIG. 22 is a side elevation view of the cam and shutter mechanism with the remaining structure omitted for purposes of clarity, and further showing its normal open position in full lines and its closed position in dotted lines;

FIG. 23 is a side elevation view of a cam and tray positioning mechanism with the remaining structure omitted for purposes of clarity, and further showing its normal blocking position in full lines and its unblocking position in dotted lines;

FIG. 24 is a side elevation view of a cam and pressure pad mechanim with the remaining structure omitted for purposes of clarity, and further showing its normal closed position in full lines and its open position in dotted lines;

FIG. 24a is a side elevation view of the slide gate and pressure pad of FIG. 24 showing the closed and open positions;

FIG. 25 is a side elevation view of a cam and tray indexing mechanism with the remaining structure omitted for purposes of clarity, and further showing its normal non-indexing position in full lines and its indexing position in dotted lines;

FIG. 26 is a section view taken along line 26—26 of FIG. 25;

FIG. 27 is a side elevation view of the cam and direction control mechanism with the remaining structure omitted for purposes of clarity, and further showing its normal inoperative position in full lines and its operative position in dotted lines;

FIG. 30 is a schematic electrical circuit diagram for the projector.

*General description*

Figure 4:
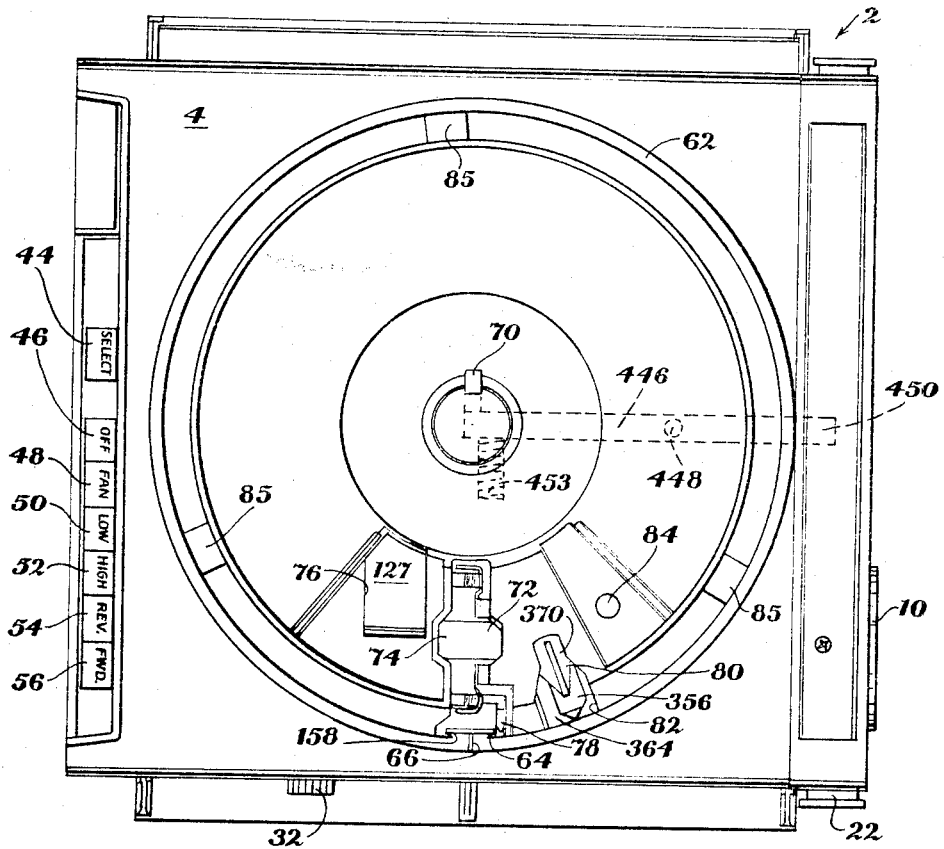
FIG. 4 is a view similar to FIG. 3, with the slide tray removed.

With respect to general function, the improved slide projector of this invention may be operated by either automatic or manual control means of the same general type disclosed in U.S. Patent No. 2,969,711. The slide projector has means mounted on top thereof for holding a plurality of slides which are to be projected, and means for cyclically indexing the slide holding means in a forward or reverse direction by the automatic or manual means for bringing successive slides in register with a vertically oriented slide or projection gate. The slide in register with the gate is lowered under the influence of gravity by a slide transport means into a viewing position in alignment with the optic system of the projector for projection. During a cycle of operation of the projector, a projected slide, if any, is returned to the slide holding means, the slide holding means indexed, and a different slide lowered by the slide transport means into the viewing position. This projector further has a half-cycle position for editing and random projection in which the slide transport means returns the projected slide, if any, to the slide holding means and is retained in that position. In addition, the indexing means is disabled in the half-cycle position. Consequently, the operator may edit the returned slide or manually move the slide holding means to any desired position for projecting the selected slide upon completion of the cycle of operation.

More specifically, as shown in the drawings, preferably FIGS. 1 and 2, a preferred embodiment of the invention is incorporated in a slide projector 2 having a rectangularly shaped cast frame 4. The front of the projector 2 has a plate 6 secured thereto having a central opening 8 through which a lens barrel 10 extends. The plate 6 further has ventilating slots 12 therein for the passage of air. The front of the projector further has a door 13 pivotally secured to frame 4 and movable by knob 14 into an open position to provide access to a cord-storage compartment 16 seen in FIG. 10. The door 13 further has ventilation openings 18 and louvers 20 through which air is exhausted from the projector. A U-shaped handle 22 is pivotally secured to frame 4 to facilitate carrying the protector 2.

Figure 10:
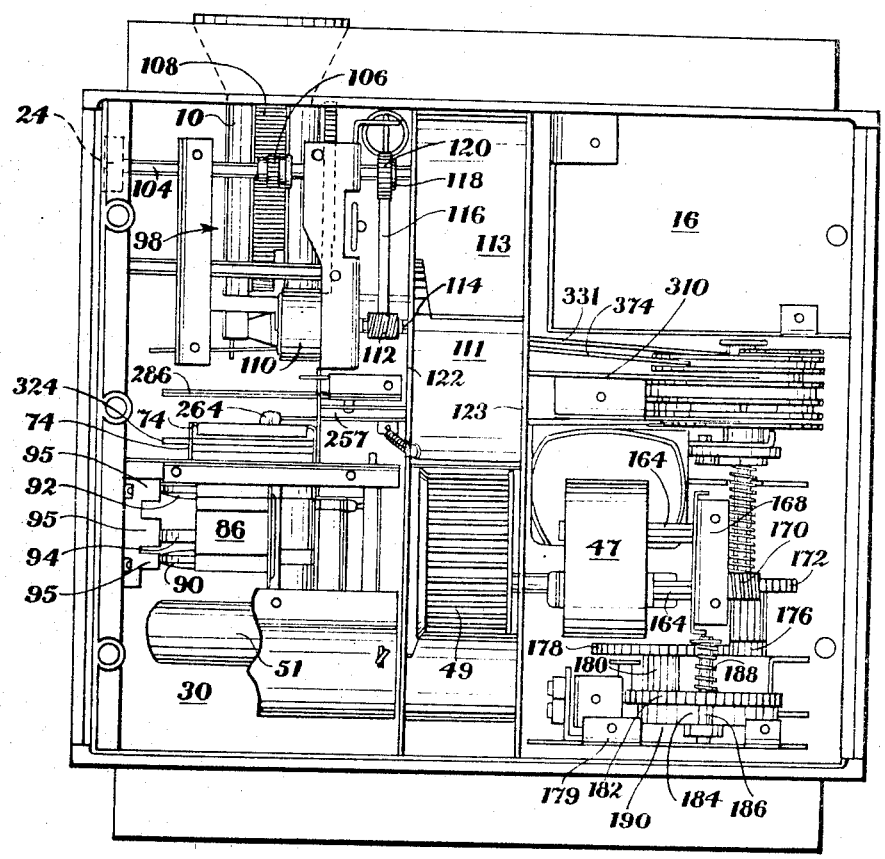
FIG. 10 is a bottom view of the slide projector of FIG. 1 with the bottom plate removed.

The left side of the projector as seen in FIG. 1 has a focus knob 24 and an elevation knob 26, and further has a cover 28 over an optics compartment 30 as seen in FIG. 10. Cover 28 has louvers 29 therein and is secured to frame 4 by means of a screw 32. The rear of projector 2 as seen in FIG. 2 has a cover plate 34 secured thereto having an index mark 36 for indicating the operating position of a control knob 38. The knob 38 has four positions designated on a flange 40 thereof, one of which is designated "manual" in which the operation of the projector is manually controlled by the operator. The three remaining positions may be designated with numbers indicating intervals between slide changes in automatic operation, for example, the projector may be set by this knob to automatically project each slide for respective 5, 10, or 20-second intervals.

Another plate 42 is secured to the rear of frame 4 and has openings through which push buttons extend for controlling various projector operations. Button 44 controls the editing and random selection projection and is designated the "select" button. Button 46 is designated the "off" button and controls the power to the projector. Button 48 is designated the "fan" button and controls the operation of a projector motor 47 which drives a fan 49, as seen in FIG. 10. Button 50 controls the power to a projector lamp 51, and is designated the "low" button because it provides a low power illumination, e.g., 300-watt lamp brilliance, by virtue of a resistor in the circuit as seen in FIG. 30. Button 52 also controls projector lamp 51 and is designated the "high" button because it provides a higher power illumination, e.g., 500-watt lamp brilliance, by by-passing the aforementioned resistor. Button 54 is designated the "rev." button and controls the operation of a slide tray 86 in a reverse direction. Button 56 is designated the "fwd." button and controls the operation of slide tray 86 in the forward direction. The plate 42 further has openings to provide access to a power cord receptacle 58 and a remote control receptacle 60.

The top of projector frame 4 has a circular inner rim 62, seen best in FIG. 3, having a lip 64 carrying an index mark 66. The top of frame 4 further has (1) an upwardly projecting central spindle 68 having a beveled top 69, and an opening, not shown, through which a spring-biased spindle key 70 extends, (2) an opening 72 (FIG. 4) in register with a slide gate 74, and (3) an opening 76 through which warm air is directed over a plurality of slides in slide tray 86 for "prepopping" the slides before projection. A tray locating projection 78 extends through a portion of opening 72, and an indexing pawl 80 extends through an opening 82 in frame 4. The function and operation of projection 78 and pawl 80 will be explained in further detail hereinafter. In addition, the top of frame 4 has an opening through which extends a locating pin 84 (to be referred to below in connection with opening 140), and a plurality of nylon inserts 85 (or other bearing surfaces) for supporting tray 86.

The circular slide tray 86 is releasably mounted on spindle 68 within rim 62 and is adapted when indexed in one direction or the other to introduce a slide by gravity into slide gate 74 and into a slide-viewing position in which the slide is in the optical axis of the projector, as will be explained below in more detail. The magazine is manually or automatically cyclically indexed in the forward or reverse direction by incremental distances corresponding to the spacing of successive slide tray compartments (see description of slide tray). A slide changing cycle of the projector generally comprises lifting a slide, if any, from its viewing position back into the tray compartment, indexing tray 86 an incremental distance, and permitting the next slide to be lowered by gravity into the viewing position.

A slide-changing cycle may be initiated and thereafter carried out automatically by a manual depression of reverse or forward push button 54 or 56 during which cycle the slide tray 86 is indexed in the reverse or forward direction, as the case may be. If either of the push buttons is held down, slide-changing cycles follow each other in rapid succession, thereby permitting a "scanning" action for viewing the slides in tray 86. The slide-changing cycle may also be initiated in the same manner by a remote control switch shown schematically in FIG. 30.

Another means for initiating a slide-changing cycle, during which only forward indexing occurs, comprises the aforementioned control knob 38 for selecting any of a plurality of cycle times, such as 5, 10, and 20 seconds. However, automatic operation at any selected cycle time may be overridden by manually operating push buttons 54, 56 since the mechanism for accomplishing automatic operation and the mechanism for accomplishing manual operation may be operated independently of one another as will be evident from the later discussion.

As indicated heretofore, an editing mechanism is provided for editing slides or to permit random or "skip" projection by the operator, in which the operator may rotate slide tray 86 to any selected position for showing any particular slide in the tray, the slides being identified by numbers appearing on the tray, as seen in FIG. 3. With this editing mechanism, it is also possible for the operator to show single slides without the use of a slide tray 86, and to provide a secondary way of editing the slides for proper placement in a slide tray.

*Optical system*

Referring to FIG. 10, the projector elements that are located along the optic axis of the system include projection lamp 51, a pair of lenses 90, 92, a heat-absorption glass 94, slide gate 74, and a focusing unit or objective designated generally at 98. The lenses 90, 92 and glass 94 are seated in slots, not shown, in an optical support 86 having approximately the same contour as the lenses and glass. The lenses 90, 92 and glass 94 are held in their seats by a plurality of spring arms 95 secured to cover 28. The lens barrel 10 of the focusing unit 98 is mounted on a pair of rails, not shown, for reciprocal movement thereon under the control of focusing knob 24 mounted on one end of a shaft 104. A gear 106 is mounted on shaft 104, and meshes with a rack 108 on lens barrel 10.

An automatic power driven focusing means is also provided comprising a bidirectional motor 110 for driving a worm 112 in meshing engagement with a gear 114 mounted on one end of a shaft 116. A worm 118 is mounted on the opposite end of shaft 116 for driving a gear 120 mounted on shaft 104.

*Air flow*

Fan 49 draws air into the optics compartment 30 through openings in the base plate, not shown, ventilating slots 12 in plate 6, louvers 29 in cover 28, and opening 72 in the top of frame 4. The air is heated in passing over lamp 51 and the optical elements 90, 94 and expelled by a duct formed by plates 111, 113 and sidewalls 122, 123; through louvers 20 in door 13. A part of this air is expelled through a duct 127 and opening 76 in the top of frame 4 as seen in FIG. 4 for passage through a portion of slide tray 86 for preheating the slides therein.

*Slide tray*

The slide tray 86 as seen best in FIGS. 1, 3, 5–8 and 9 comprises a cylindrical molded portion having concentric plastic shells 119, 124 (see FIG. 3). One end of shell 119 is closed off to form a base 131, and the tops of shells 119, 124 are joined together by spacers 117 to form a plurality of spaced compartments. In the embodiment shown, there are eighty-one equally spaced compartments. Each spacer 117 has a notch 115 therein to facilitate the insertion and removal of slides into and out of the compartments. The outer shell 124 has a peripheral rim 126 containing raised numerals as shown in FIG. 3, corresponding to and designating the compartments. Corresponding indexing means, in this embodiment pins 129 (FIG. 6), depend from rim 126. The "0" compartment has a bridge 128 extending thereacross to prevent the insertion of a slide therein from the top for a purpose to be explained hereinafter. All of the remaining compartments are open at both the top and the bottom.

Figure 5:
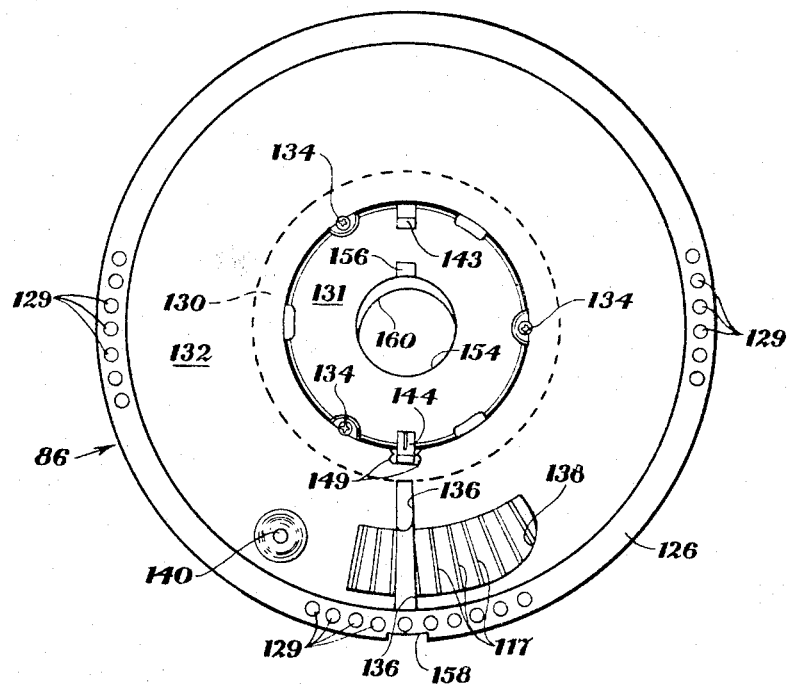
FIG. 5 is a bottom view of the slide tray.
Figure 6:
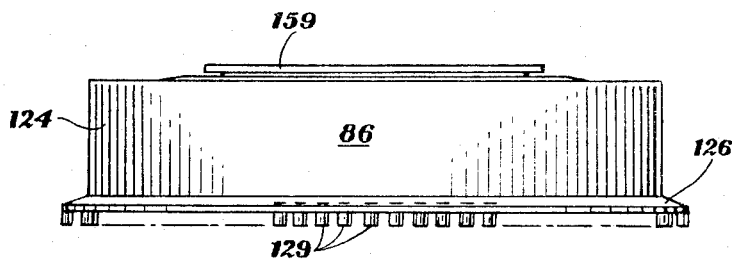
FIG. 6 is a side elevation view of the slide tray of FIG. 5.

The outer periphery of base 131 of the molded portion of slide tray 86 provides an annular shoulder 130 as seen in FIG. 5 for supporting another portion of slide tray 86 shown as an annular metal disc 132. The disc is rotatable on shoulder 130, and is retained thereon by the heads of three screws 134. Disc 132 further has an opening 138 through which heated air expelled from projector opening 76 is directed when the tray 86 is properly mounted on projector 2 for operation, for circulating heated air over the slides for preheating the slides in tray 86. Opening 138 has radially extending notches 136 co-operating therewith to form a passageway through which the slides can pass from tray 86 to slide gate 74. At this point, it should be noted that if bridge 128 were omitted, any slide introduced into the "0" compartment would fall out of slide tray 86 through the passageway when the "0" compartment is in alignment with the passageway.

Disc 132 further has an opening 140 adapted to co-operate with pin 84 for fixedly positioning disc 132 on projector 2 as will be explained hereinafter.

A metal latch 142 as best seen in FIGS. 7 and 8 has oppositely extending tabs 143, 144 slidably movable in complementary openings, not shown, in base 131, which guide the latch for reciprocal movement in a radial direction. The latch 142 further has a pair of spring fingers 148, one end of which are adapted to co-operate with a shoulder 150 of base 131 to urge latch 142 to a latched position in which tab 144 enters a pair of spaced notches 149 along the inner periphery of disc 132 for releasably holding the disc in a fixed position with respect to base 131. In this position, the passageway formed by notches 136 in disc 132 is in register with the "0" compartment. The opposite ends of fingers 148 co-operate with abutments 152 of base 131 which provide a stop for latch 142 when moved to its unlatched position.

The base 131 has a central opening 154 (FIG. 5) having a notch 156 along its inner periphery or rim in alignment with tabs 143, 144, and further in alignment with a notch 158 in rim 126 at the location of the "0" compartment as best seen in FIG. 5. The latch 142 also has an opening 160 which is offset out of alignment with opening 154 when in the latched position, but is in register with opening 154 in the unlatched position. When slide tray 86 is initially placed on top of frame 4, spindle 68 extends through openings 154, 160, and rim 126 of tray 86 will bear on lip 64 and key 70 allowing manual rotation of tray 86 by the operator. The tray is rotated until notches 156, 158 align with lip 64 and key 70 respectively, and are received thereby, causing tray 86 to drop until pins 129 engage inserts 85. As tray 86 drops into engagement with inserts 85, beveled portion 69 of spindle 68 cams latch 142 into its unlatched position. The tray 86 is now in a proper loaded position with the "0" compartment in register with index 66. Also, in this position pin 84 extends through disc opening 140 for fixedly positioning disc 132 with notches 136 of its slide passageway in register with gate 74.

Figure 9:
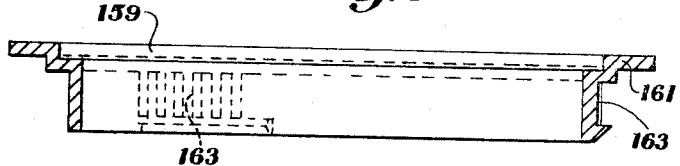
FIG. 9 is a side elevation view in section of the slide retaining ring of the slide tray.

During projection, disc portion 132 remains fixed and the molded portion comprising shells 119, 129, base 131 and spacers 117 is indexed as a unit relative thereto to successively bring the slides in register with the disc passageway. With disc 132 releasably held by latch 142, the operator is in a position to load slide tray 86 with cardboard, glass, metal, plastic or any other suitable type slides which fit within the spaces between spacers 117. The slides are retained in the compartments by a slide-retaining cover ring 159, as seen in FIG. 9, of molded plastic or other suitable material. This cover fits within shell 119 and has a peripheral flange 161 which overlaps the slide compartments to prevent the slides from falling out if the slide tray assembly is tipped upside-down, as in storage, or otherwise. The ring 159 has three angularly spaced, stepped ramps 163 which twist-lock on corresponding lugs 165 (FIG. 3) located on the inner periphery of shell 119. When rotated in one direction, the ring 159 locks to retain the slides in slide tray 86, and when rotated in the opposite direction, it may be removed from tray 86 for slide editing or loading.

*Drive mechanism*

The drive mechanism as seen best in FIGS. 10 and 11 comprises drive motor 47 rigidly secured to a fixed support bracket 168 by means of screws, not shown, extending through spacer elements 164. The motor 47 has a worm 170 for driving a gear 172 that is loosely rotatable on a shaft 174. A gear 176 integral with gear 172 drives a gear 178 which has a gear 180 integral therewith. Gears 178 and 180 are rotatably mounted on a fixed spindle 181 secured to a wall 179, and gear 180 further drives a gear 182 having a timing wheel 184 integral therewith. The timing wheel 184 and gear 182 are loosely mounted on a fixed shaft 186 secured to wall 179, and are axially urged by a spring 188 in a direciton causing a flat face 190 of wheel 184 to engage an arm 192 of a bell crank 194 pivoted on a shaft 196 (see also FIG. 16). The position of bell crank 194, and hence the axial position of wheel 184 and gear 182 is controlled by a rectangular cam 198 seen best in FIG. 12. The cam 198 is rotatably mounted on a post 200 secured to wall 179.

The aforementioned control knob 38 is mounted on the face end of post 200, and is adapted upon manual rotation thereof to present the four-edge surfaces of cam 198 to an arm 199 of bell crank 192, and cause the timing wheel 184 and gear 182 to assume four different axial positions along shaft 186. The spring 188 maintains gear 182 and wheel 184 tightly against arm 192, and therefore acts as a detent for holding the rotated setting of cam 198. The timing wheel 184 has four lobes 204, 206, 208 and 210 (see FIG. 13) equally spaced around its periphery. Each lobe 204 and 208 extends one predetermined unit of distance toward wall 179 from the face of gear 182; lobe 206 is a length of approximately two such units; and lobe 210 has a length of approximately three units. The lobes on wheel 184 are adapted to co-operate with an arm 212 at one end of a lever 214 pivoted on a post 216 secured to wall 179; the opposite end of lever 214 being secured to an armature plate 218 of an electromagnet 220. A spring 213 urges lever 214 in a direction causing a rib 215 formed thereby to be engageable by a free end 222 of a helical clutch spring 224 (see FIG. 16).

When one of the lobes engages arm 212 upon rotation of wheel 184, it temporarily rocks lever 214 against the bias of spring 213 causing rib 215 to release end 222 of clutch spring 224. The helical clutch spring 224 is of a well known type, and is further disclosed in detail in the aforementioned U.S. Patent No. 2,969,711. It will suffice here to say that when free end 222 is held stationary by rib 215, the coils of the spring are enlarged so that shaft 174 is not driven thereby. On the other hand, when spring end 222 is released by pivotal movement of lever 214 caused by energization of electro-magnet 220 the spring constricts, connecting motor 162 to shaft 86 for driving same. If the coil of electromagnet 220 is energized only momentarily, as is the usual case, by depression of the forward, reverse or remote control buttons, the coil is de-energized before spring end 222 has completed one rotation, and hence lever 214 is returned by spring 213 causing rib 215 to intercept end 222 after the first full rotation of clutch spring 224 thereby disengaging same and breaking the driving connection. If the coil of electromagnet 220 remains energized for more than one rotation of clutch spring 224, the driving connection is maintained for a corresponding number of rotations, but is always broken at its full cyclic position when the electromagnet 220 is de-energized.

The gear ratios of the various intermeshing worms and gears 170, 172, 176, 178, 180 and 182 are such as to cause timing wheel 184 to complete a single revolution in any desired amount of time. In the projector shown, a single rotation of timing wheel 184 requires 20 seconds.

When control knob 38 is moved to a position aligning the numer 5 with index mark 36, cam 198 is positioned to locate timing wheel 184 axially along shaft 186 in such a position that all four lobes 204, 206, 208 and 210 on wheel 184 are aligned vertically with arm 212. Consequently, each of the lobes initiates a slide-changing cycle, and one cycle is initiated every 5 seconds. When the knob is turned aligning numeral 10 with index 36, only two of the lobes 206 and 210 engage arm 212, and since the lobes are diametrically opposed on wheel 184, a slide-changing cycle occurs at two evenly spaced time intervals of 10 seconds during one revolution of timing wheel 184. When the control knob 38 is turned with numeral 20 in alignment with index mark 36, only lobe 210 of timing wheel 184 engages arm 212 and a slide-changing cycle is initiated only once during each rotation of timing wheel 184, or every 20 seconds. Finally, when control knob 38 is turned so that the designation "Manual" is in register with index mark 36, none of the lobes on timing wheel 184 are in alignment with arm 212 and no automatic slide-changing can occur.

Figure 18:
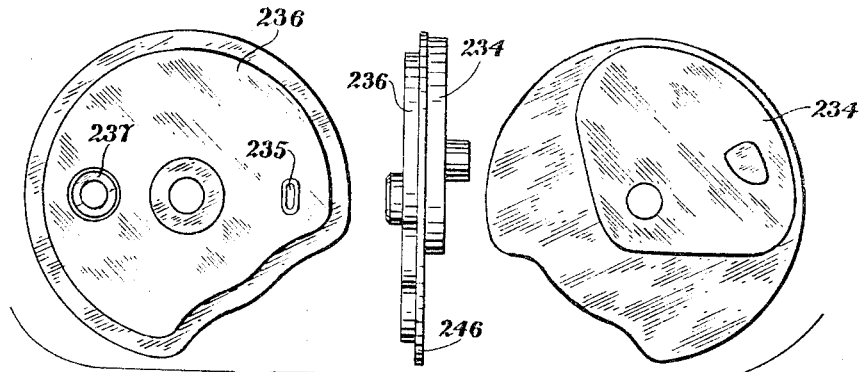
FIG. 18 is a combination side elevation and end views of a pair of cams for operating the shutter and slide transport mechanisms.
Figure 19:
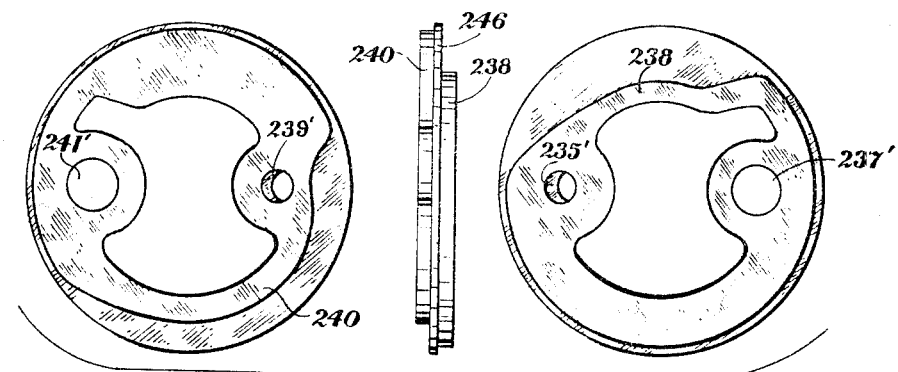
FIG. 19 is a view similar to FIG. 18 of another pair of cams for operating the pressure pad and tray positioning mechanisms.
Figure 20:
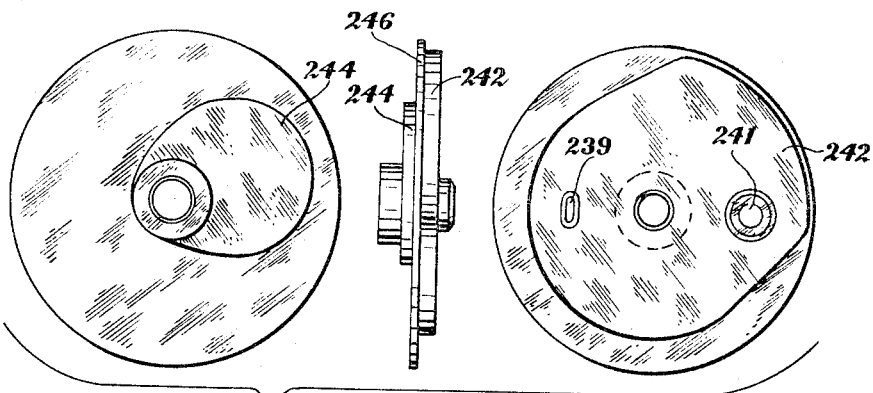
FIG. 20 is a view similar to FIG. 18 of still another pair of cams for operating the tray indexing and direction control mechanisms.

A phualirty of cams 234, 236, 238, 240, 242, and 244 are loosely mounted on drive shaft 174, and are separated from one another for individual action by means of spacer discs 246 and integrally formed matching pairs of ribs and slots 235, 235'; 237, 237'; 239, 239'; and 241, 241' as best seen in FIGS. 18–20.

Figure 16:
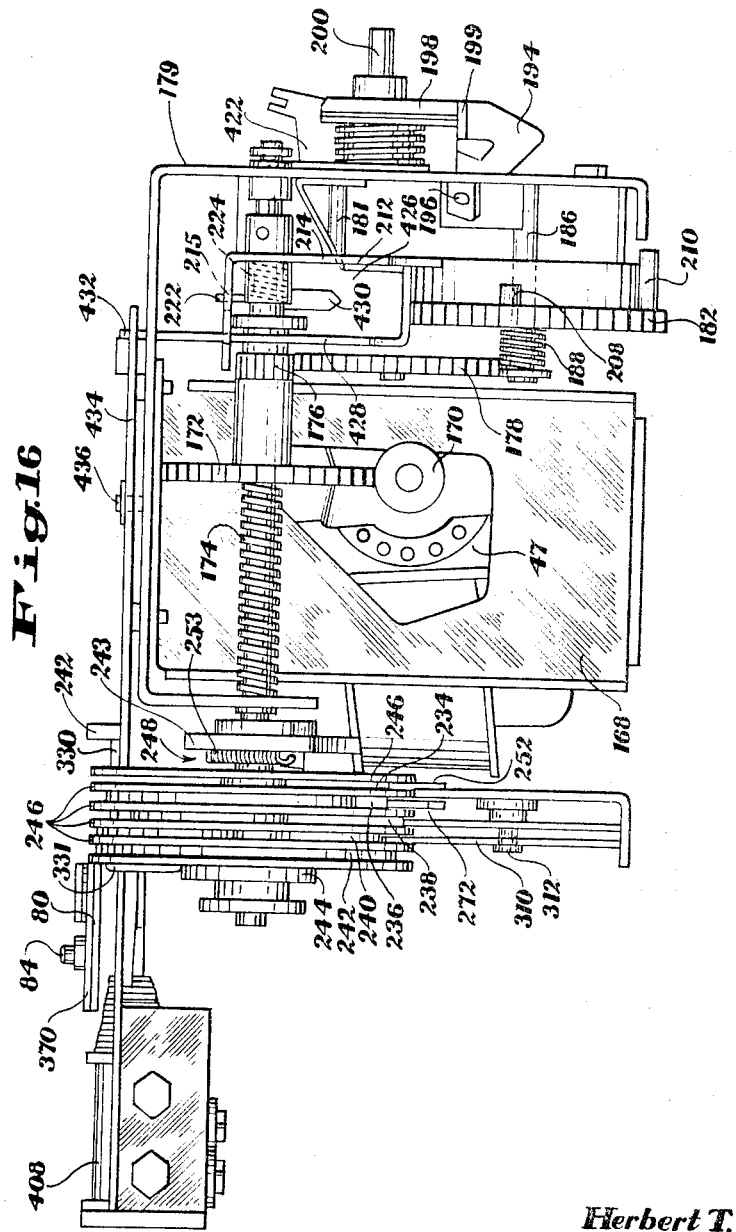
FIG. 16 is a left side elevation view of the component of FIG. 12.

The cams are further drivingly connected to shaft 174 by means of a safety clutch 248 (see FIGS. 11, 12 and 16.). The clutch comprises a plastic plate 243 secured to shaft 174, and having a U-shaped lever 245 pivotally mounted intermediate its ends on a post 247 carried by plate 243. Lever 245 has a lug 249 at one end adapted to engage a projection 251 on cam 234. A spring 253 connects the opposite end 255 of lever 245 to plate 243. In operation, rotation of shaft 186 is transmitted to the cams by the lug 249 and projection 251 connection, but if for any reason the cams or the apparatus operated thereby should become jammed, the lever 245 will pivot against the bias of spring 253 causing lug 249 to pass under projection 251 breaking the driving connection therebetween.

Each of the cams co-operates with a corresponding cam follower for accomplishing a plurality of projector operations in timed sequence which will be explained hereinafter.

Slide lifter mechanism

Figure 17:
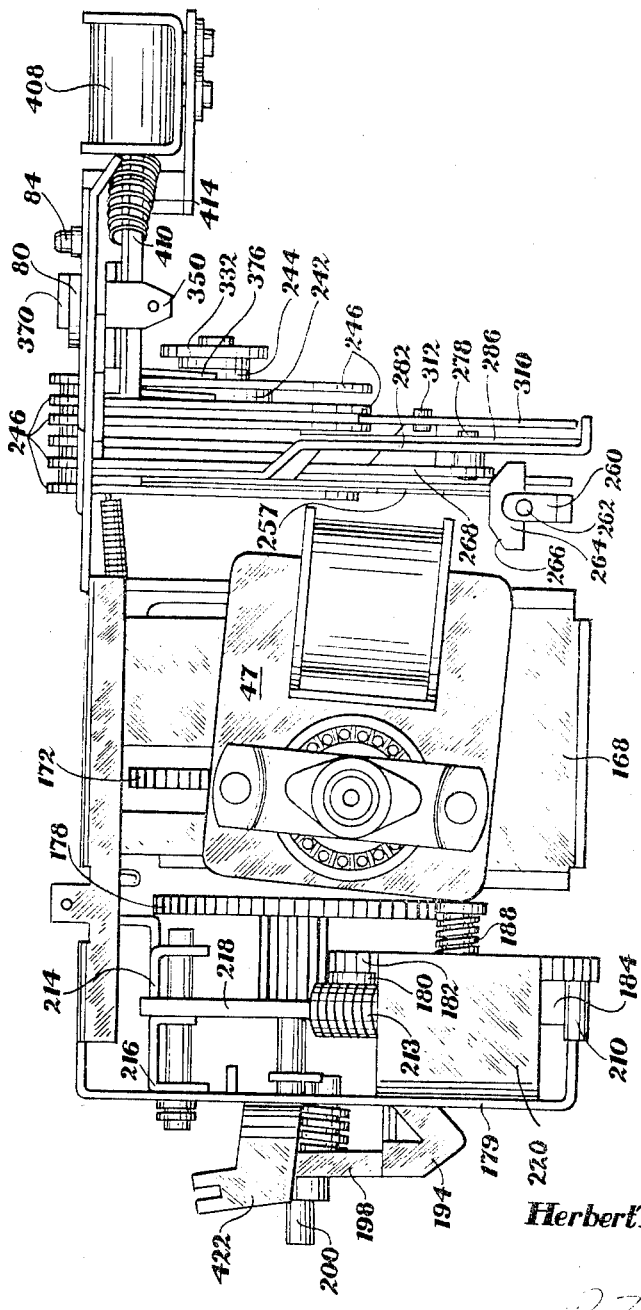
FIG. 17 is a right side elevation view of the component of FIG. 12.

The lifter mechanism, as best seen in FIGS 11, 12, 17 and 21, comprises a lever 257 pivoted on pin 250 secured to a frame 292 which is integral with wall 179. The lifter mechanism further has a cam follower 252 that is urged into engagement with periphery of cam 234 by a spring 254 interposed between wall 122 and a lug 258 on lever 257. A lifter plate 260 is secured to the end of lever 257 by a screw 262, and has a plastic cap 264 pressfit thereon. The cap 264 has beveled edges 266 as seen in FIG. 17 for a purpose to be explained hereinafter. During a single cycle of operation and hence one complete revolution of shaft 174 and cam 234, lever 257 and cap 264 are raised to the dotted position shown in FIG. 21 for engaging and returning a projected slide back into its compartment of slide tray 86, and then lowered to gently lower the next slide into its viewing position in engagement with stops, not shown, in gate 74.

Shutter mechanism

The shutter mechanism as best seen in FIGS. 11, 14 and 22 comprises a V-shaped lever 268 pivoted on a pin 270 secured to support frame 282, and further having a cam follower 272 at one end urged into engagement with the periphery of cam 236 by a spring 274 interposed between lever 268 and frame 282. The opposite end of lever 268 has a laterally extending pin 278 extending through a slot 280 shown dotted in frame 282, and is adapted to co-operate with slots, not shown in a pair of shutter blades 286 which are pivoted at 288 and 290 (see FIG. 15) for opening and closing shutter blades 286 in a manner well known in the art. Spring 274 further biases the shutter mechanism into a normal position in which the shutter blades 286 are in an open position as seen in full lines in FIG. 22. During a single cycle of operation corresponding to a single revolution of cam 236, the shutter blades 286 are moved into a closed position and then returned to their normal open position at the end of the cycle of operation. The periphery of cam 236 is so designed that the shutter blades 286 are held in a closed position during the entire period that the lifter mechanism lifts the projected slide, and allows the next slide to move to its viewing position. As a consequence, movement of the slide is not projected.

Slide tray positioning mechanism

The slide tray positioning mechanism, as best seen in FIGS. 11, 12 and 23 comprises a relatively straight lever 292 having a cam follower 294 at one end in engagement with the periphery of cam 238. Lever 292 further has a guide slot 296 co-operating with pin 272 to aid in guiding the lever for reciprocal movement. A spring 298 interposed between lever 292 and a pin 300 on frame 282 urges cam follower 294 into engagement with the periphery of cam 238. A plastic positioning element 302 has portions thereof extending through a slot 304 in frame 282, and is secured by any suitable means to the opposite end 306 of lever 292. The positioning element 302 further has the aforementioned projection 78 which is adapted to be selectively moved into the spaces between adjacent indexing pins 129 depending from rim 126 upon reciprocal movement of lever 292. The pins 129 are so positioned on rim 126 that when projection 78 is moved into the space between any two adjacent pins, it blocks or prevents movement of slide tray 86 in either direction, and further positions slide tray 86 with one of its compartments in alignment with notches 136 of the guideway in disc 132 which, as indicated heretofore, is in alignment with gate 74. When projection 78 is withdrawn clear of pins 129, the slide tray 86 may be freely indexed in a forward or reverse direction.

Pressure pad mechanism

The pressure pad mechanism as seen best in FIGS. 10, 24, and 24a comprises a lever 310 pivotally mounted on a post 312 on frame 282, and having a cam follower 314 at one end adapted to be urged into engagement with the periphery of cam 240 by a spring 316 interconnecting lever 310 and pin 300. The opposite end 318 of lever 310 engages an arm 320 of a U-shaped pressure pad 322 pivotally mounted on a spindle 324 supported by gate 74. Pressure pad 322 has spaced-apart spring fingers 326, and a spring 328 interconnects pad 322 with gate 74 for urging spring fingers 326 against gate 74 in the absence of a slide, or against the edge of a film mount lowered into gate 74 while the projector is in its normal rest position. During a cycle of operation of the projector, pressure pad 322 is pivoted after the top edge of a projected slide enters its compartment on its return trip causing fingers 326 to open releasing the slide so that it may be returned the rest of the way into its compartment. The next succeeding slide is then lowered by the lifter mechanism to the viewing position for projecting. After the slide arrives at the viewing position, pressure pad 322 is returned to its original position causing fingers 326 to gently grasp the slide.

Indexing mechanism

The indexing mechanism as seen best in FIGS. 12, 15, 25 and 26 comprises a plate 330 having a bent tab 331 whose edge forms a cam follower 322. A spring 334 interposed between a lug 336 of plate 330 and frame 282 urges cam follower 332 into engagement with the periphery of cam 244. The plate 330 has an elongated slot 340 (see dotted in FIG. 12) through which a post 342 on frame 282 extends. A steel washer, not shown, is interposed between frame 282 and plate 330 to provide a relatively frictionless surface for the sliding movement of plate 330. The opposite end 344 of plate 330 has an opening 346 for receiving a bearing 348 as seen in FIG. 26. An L-shaped arm 350 is disposed on one side of bearing 348, and a plastic pawl 80 on the opposite side having a cylindrical portion 354 extending through an elongated slot 356 (see FIG. 12) in support frame 282.

The arm 350 and pawl 80 are secured together by means of a screw 360 for pivotal movement of arm 350, bearing 348 and pawl 80 as a unit in opening 346.

A plate 362 is pivoted on the base of pin 84 on frame 282, and is adjustably secured to frame 282 by a screw 361 as seen in FIG. 12. Plate 362 further has an elongated slot 364 whose sides 366 and 368 form cam surfaces for pawl 80. The pawl 80 has a narrow pointed rib 370 which is adapted to co-operate with pins 129 on slide tray 86 for indexing the slide tray in a forward or reverse direction upon forward movement of plate 330 by cam 244.

With pawl 80 following cam surface 366, forward movement of plate 330 by cam 244 will cause rib 370 to enter the space between two adjacent pins 129 of slide tray 86 and to cam the slide tray in a forward indexing direction. On the other hand, with pawl 80 following cam surface 368, forward movement of plate 330 and pawl 80 will cause rib 370 to enter the space between two pins 129 and cam slide tray 86 in the opposite or reverse indexing direction. By adjusting plate 362, it is possible to locate cam surfaces 366 and 368 so that rib 370 will accurately enter the space between adjacent pins 129. The rib 370 and projection 78 operate in proper timed relation so that during any cycle of operation at least one of them is in position to block inadvertent manual movement of a portion of slide tray 86 to prevent jamming.

Pawl positioning mechanism

The mechanism for positioning pawl 80 in a forward or reverse indexing position as best seen in FIGS. 11, 15 and 27 will now be described. This pawl positioning mechanism comprises a lever 372 having a depending tab 374 whose edge forms a cam follower 376. A spring 378 interconnects lever 372 with frame 282 for urging cam follower 376 into engagement with the periphery of cam 242. The lever 372 further has an elongated slot 380 through which post 342 extends for guiding lever 372 for reciprocal movement. The opposite end 382 of lever 372 pivotally supports a plate 384 on a stud 386. Plate 384 has a lug 388 having a notch 390 for receiving a spring wire 392, one end of the wire being secured to stud 386 and the opposite end extending through an opening 394 in arm 350. Frame 282 has a laterally extending bracket 396 having a pair of spaced-apart arcuate slots 398, 399 as seen in FIGS. 11, 12 and 15. The plate 384 has a pair of laterally extending pins 400 and 402 extending through respective slots 398 and 399.

A fan-shaped blocking plate 404 interposed between plate 384 and bracket 396 has one end pivotally mounted on a stud 406 carried by bracket 396, and a solenoid 408 mounted on bracket 396 has an arm 410 secured to plate 404 by a rivet 412. A helical spring 414 encircling arm 410 is interposed between a shoulder 416 and solenoid 408 for moving arm 410 and plate 404 in one direction until the end of arm 410 engages a stop lug 418. In this position, the front end 420 of plate 404 is positioned in front of pin 402, but is out of the path of pin 400. Accordingly, upon forward movement of lever 372 by cam 242, pin 402 will initially engage end 420 of plate 404 and will act as a pivot for plate 384. Upon further movement of lever 372, plate 384 will be pivoted about pin 402, with pin 400 moving along slot 398. As plate 384 is pivoted, lug 388 moves wire 392 which in turn moves arm 350 and pawl 352 into engagement with cam surface 366. In this position, pawl 352 is in a forward indexing position.

To move pawl 352 into a reverse indexing position, the solenoid 408 is energized pivoting plate 404 and withdrawing its end 420 from the path of pin 402 and positioning it in the path of pin 400. Consequently, upon forward movement of lever 372 by cam 242, pin 400 initially engages end 420 and acts as a pivot for plate 384 while pin 402 moves along slot 399. Pivoting plates 384 in this direction causes lug 388 to move spring wire 392 and arm 350 in a clockwise direction as seen in FIG. 11 causing pawl 352 to engage cam surface 368. In this position, pawl 352 is in a reverse indexing position.

Cycle of operation

Figure 28:
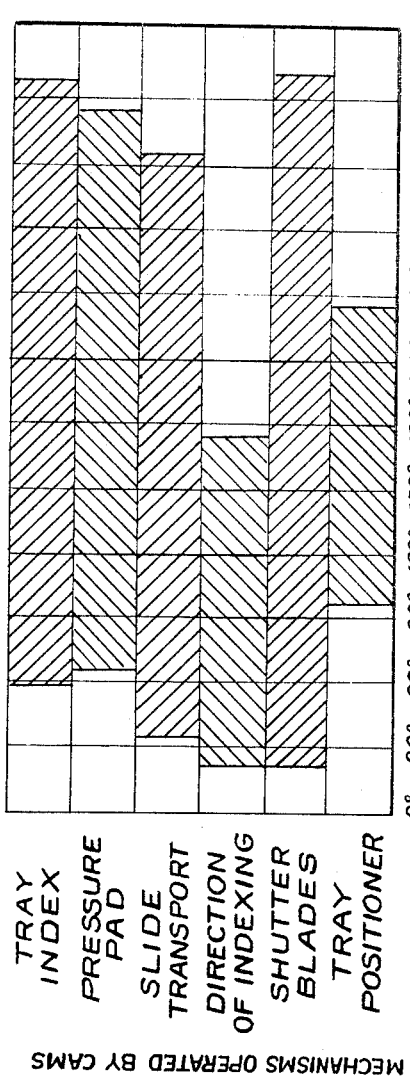
FIG. 28 is a graph showing the relative relationships between the driven mechanisms for one complete cycle of operation.
Figure 29:
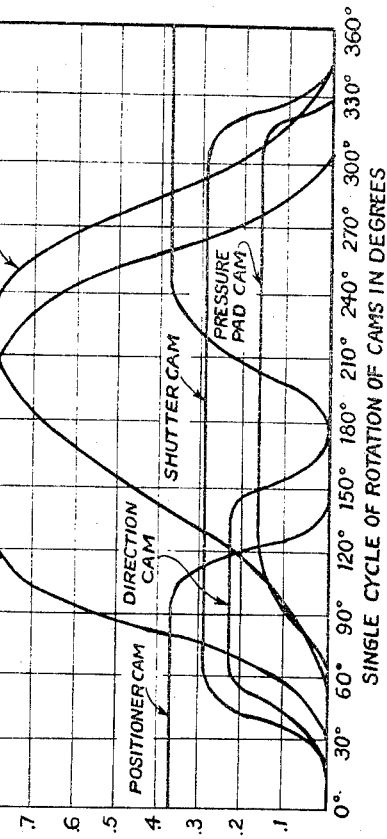
FIG. 29 is a graph showing the rise and fall of the cams for one complete cycle of operation.

As indicated earlier, momentary energization of electromagnetic 220 releases clutch spring 224, causing shaft 174 and the cams mounted thereon to rotate through a single revolution at which time spring end 222 engages rib 215 to disconnect drive motor 162 from shaft 174. As soon as the driving connection is broken by clutch spring 224, the cams are stopped and held in a rest position by the frictional action of shaft 174 and the cam followers and their springs. With the cams in this rest position, should the operator now momentarily energize electromagnet 220, the following sequence of projector operations will occur, as seen in FIGS. 28 and 29. After approximately 20 degrees of rotation of the cams, the shutter and pawl positioning mechanisms are actuated to begin closing the shutter blades 286 and to move pawl 352 in a position for forward or reverse operation. Approximately 15 degrees later, the shutter blades 286 are closed and pawl 352 is moved into the forward indexing position. At this time, the lifter mechanism is actuated causing lever 249 to begin its upward movement to return a slide from gate 74 back into a slide tray 86. About 25 degrees of rotation later, indexing plate 330 is actuated to start the indexing of slide tray 86, and 5 degrees later, pressure pad lever 310 is actuated to withdraw spring fingers 326 from gate 74. Approximately 30 degrees of rotation later, positioning lever 292 is actuated to unblock slide tray 86 for indexing.

The mechanisms all remain in various stages of operation for approximately 60 degrees of rotation. At this point, the forward indexing of slide tray 86 is completed and the pawl positioning mechanism is gradually returned to its original position. Approximately 60 degrees of rotation later, positioning lever 292 is returned between two adjacent pins 129 to block movement of and accurately position slide tray 86. Upon continued rotation of the cams for approximately another 60 degrees, lever 249 is returned to its original position lowering a slide into its viewing position. About 20 degrees later, pressure pad lever 310 returns to its original position gripping the lowered slide. About 15 degrees later, indexing plate 330 returns to its original position, and a few degrees later, shutter blades 286 are returned to their open position. The shaft 174 and cams arrive at their rest position about 20 degrees of rotation later to complete the cycle of operation.

Skip projection

During the projection of a tray of slides, the operator may desire to show a specific slide out of sequence or to edit one of the slides in the tray during projection as indicated heretofore. The mechanism for accomplishing this (see FIGS. 12, 13, 14 and 16) comprises a lever 422 having select button 44 on one end and the opposite end pivoted on post 200. Lever 422 has an arm 424 for engaging and moving a bellcrank 426 pivotally mounted on spindle 181. The bellcrank 426 is movable by select button 44 to an operative position causing an arm 428 to engage lever 214 and pivot it about post 216 to release clutch spring 224. The bellcrank 426 further has a notch terminating in a shoulder 430 (see FIGS. 13 and 16) which is adapted in the operative position to stop in the half-cycle position; that is, after a half a cycle of operation has been completed. The bellcrank 426 further has another arm 432 which engages one end of a lever 434 pivoted on a stud 436 carried by frame 282. A spring 438 interposed between lever 434 and a lug 440 on frame 282 urges the end of lever 434 into engagement with arm 432 and biases bellcrank 426 to its normal inoperative position. The opposite end of lever 434 has a pin 442, adapted upon pivotal movement of lever 434 resulting from movement of bellcrank 426 to its operative position, to engage an edge 444 of plate 330 and move it in a lateral direction onto an adjacent hub 443 and into engagement with a stop washer 447, thereby disengaging cam follower 332 from cam 244. As a result, pawl 80 remains in its original position clear of pins 129 of tray 86 as the projector is half-cycled.

Accordingly, in this half-cycle position, the lifter lever 249 and cap 264 are in their uppermost position having just returned the previously projected slide from gate 74 back into its slide tray compartment. Also, in this position, projection 78 is withdrawn clear of pins 129 of slide tray 86, and pawl 352 is likewise clear of pins 129 as indicated heretofore. Consequently, as long as select button 44 is maintained in the depressed position by the operator, the projector will be held in its half-cycle position, and the operator is free to edit the previously projected slide or to rotate slide tray 86 to any desired slide compartment number. In this half-cycle position, cap 264 extends slightly above the level of disc 132 (see FIG. 21) so that as the operator turns the slide tray, edges 266 of cap 264 will cam the slides above the level of the remaining slides in the slide tray 86 so that the operator can clearly see which particular slide is in register with index 66, and hence the disc passageway, and also to prevent the bottom edges of the slides from catching on the edges of notches 136 of the disc passageway. As soon as the operator has turned slide tray 86 a sufficient distance so that the desired slide or compartment number is in alignment with index 68 and the disc passageway, select button 44 is released, releasing clutch spring 224 for driving shaft 174 causing the projector to complete the cycle of operation.

As the cycle of operation is completed, the desired slide, or the edited slide if the tray hasn't been moved, is lowered into gate 74 into the viewing position where it is gently clamped by spring fingers 326 for projection. While the projector is in the half-cycle position, shutter blades 286 are in a closed position so that no light is being projected. The index lever because of the bias direction of spring 334 returned from the adjacent hub 443 into alignment with its cam 244.

The half-cycle mechanism described for skip projection may also be used for showing single slides with slide tray 86 removed from the projector. To accomplish this, the operator manually inserts a slide into a gate 74, and pushes the slide down into the viewing position. After the slide has been projected, the operator depresses one of the buttons 44, 54 or 56 causing the projector to cycle raising lifter plate 260 and ejecting the slide. This further permits a means of the operator to edit the slides before loading them in slide tray 86. A preferred way of editing the slides, however, is to mount a slide tray 86 on the projector and to introduce a slide in the first compartment. The projector is cycled to project the slide. If the side is reversed or defective, select button 44 is pressed returning the slide to its compartment for reversal or removal. If the slide is satisfactory, another slide is introduced into the second compartment, and the projector cycled to project that slide. This procedure is followed for all the slides loaded into tray 86.

Since slide tray 86 is circular, the projector is naturally adapted for continuous repeater operation. All the operator need do is move control knob 38 to a selected automatic time-interval position of 5, 10 or 20 seconds and continuous repeating operation is achieved. If the operator wishes to show 81 slides, or have a title slide, or to interpose a thin piece of cardboard for blocking the light projection after or before all the slide trays have been projected, the slide, title slide, or cardboard must be pushed into gate 74 into the viewing position by the operator before slide tray 86 is assembled on the projector 2. During operation of the projector 2, the slide, title slide or cardboard will be lifted into the "0" or blocked-off compartment in slide tray 86 and will be lowered into gate 74 when the slide tray reaches its original starting position. The slide, title slide, or cardboard will remain in gate 74 when slide tray 86 is removed.

*Emergency slide tray release*

As indicated earlier, when slide tray 86 is properly positioned on the projector 2, notches 158 and 156 are aligned with lip 64 and spindle key 70 respectively. After the first cycle of operation, the operator is prevented from removing slide tray 86 from projector 2 by the interaction between rim 126 and lip 64, and between key 70 and the inner periphery 154 of base 131. If the slide-changing mechanism should become inoperative for any reason, the operator may remove slide tray 86 from projector 2 by means of an emergency lever 466 (see dotted in FIG. 4) pivoted at 448 to the underside of frame 4 and having a handle 450 extending through a slot, not shown, in the side of frame 4 and accessible for manual movement by the operator on opening the storage compartment door 28. The key 70 is integral with the opposite end of lever 446, and a spring 452 interposed between lever 446 and frame 4 moves the key outwardly into its normal position. Once slide tray 86 has been removed in this manner, the latch 142 on base 131 of the tray is no longer in engagement with notches 149 in disc 132 and hence is unlatched. The operator must turn disc 132 until it is latched to base 131, remove the defective slide or foreign object causing the slide-changing mechanism to become inoperative, and then replace the slide tray on the projector.

The invention has been described in detail with particular reference to the preferred embodiment thereof, but it will be understood that variations and modifications can be effected in the scope of the invention as described hereinabove and as defined in the appended claims.

I claim:

1. A projector for projecting slides disposed in a slide tray having two relatively movable portions secured to one another as an assembled unit, the portions of the tray coacting to retain slides in the tray during storage, one of the portions of the tray having a passageway through which the slides are adapted to pass substantially vertically, one at a time, in coordination with relative movement of the portions, with at least one of the remainder of the slides held in the tray by the one portion, and projector comprising:

a projection gate, means for fixedly holding the one portion of the slide tray relative to the projector with the passageway in substantially vertical register with said gate when the slide tray is mounted on the projector, indexing means adapted to move the other portion of the slide tray relative to the one fixedly held portion thereof for successively bringing slides in the slide tray one at a time into substantially vertical register with the passageway, and means operating in timed relation with said indexing means for successively feeding and returning each of the slides substantially vertical through the passageway and between the slide tray and said projection gate.

2. Apparatus for projecting slides comprising:
a slide projector, and
a slide tray including two relatively movable portions secured to one another as an assembled unit, said portions of said slide tray being mountable as an assembled unit on said projector for delivering the slides to be projected and being detachable from the projector as an assembled unit for removal and storage of the slides, said portions coacting to retain slides in said tray during storage, one of said portions of said tray having a passageway through which the slides are adapted to pass substantially vertically, one at a time, in coordination with relative movement of said portions, while others of the slides are held in said tray by said one portion, said projector including:

a projection gate, means for fixedly holding said one portion relative to said projector with said passageway in substantially vertical register with said gate when said slide tray is mounted on said projector, indexing means adapted to move said other portion of said slide tray relative to said one fixedly held portion thereof for successively bringing slides in said slide tray one at a time into substantially vertical register with said passageway, and means operating in timed relation with said indexing means for successively feeding and returning each of the slides substantially vertically through said passageway and between said slide tray and said projection gate.

3. The invention according to claim 2 wherein said holding means comprises a pin and slot connection between said one portion of said slide tray and said projector.

4. The invention according to claim 2 wherein said projector further includes means adapted to interact with said tray for preventing removal of said tray from said projector once said other portion has been moved by said indexing means.

5. The invention according to claim 2 wherein said other portion of said tray has spaced rims having aligned notches therein, and said slide projector has spaced, aligned projections adapted to pass through said notches when said slide tray is mounted on said slide projector, said projections overlying said rims upon movement of said other portion to prevent removal of said tray from said projector once said other portion has been moved by said indexing means.

6. The invention according to claim 2 wherein said other portion of said tray has spaced rims having aligned notches therein, and said slide projector has spaced, aligned projections adapted to pass through said notches when said slide tray is mounted on said slide projector, said projections overlying said rims upon movement of said other portion to prevent removal of said tray from said projector once said other portion has been moved by said indexing means, one of said projections being retractable out of overlying relationship with its corresponding rim to permit removal of said tray.

7. Apparatus for projecting slides comprising:
a slide projector, and
a slide tray including two relatively movable portions secured to one another as an assembled unit, said portions of said slide tray being mountable as an assembled unit on said projector for delivering the slides to be projected and being detachable from the projector as an assembled unit for removal and storage of the slides, said portions coacting to retain slides in said tray during storage, one of said portions of said slide tray having a passageway through which the slides are adapted to pass, one at a time, in coordination with relative movement of said portions, while others of the slides are held in said tray by said one portion, said projector including:

a projection gate, means for fixedly holding said one portion relative to said projector with said passageway in register with said gate when said slide tray is mounted on said projector, indexing means adapted to move said other portion of said slide tray relative to said one fixedly held portion thereof for successively bringing slides in said slide tray one at a time into register with said passageway, and means operating in timed relation with said indexing means for transporting each of the slides through said passageway and into and out of said projection gate for projection, said other portion of said slide tray and said projector having a notch and a projection respectively for mating engagement with one another, said projection being adapted to pass through said notch when said slide tray is mounted on said projector, whereby said other portion and said projection cooperate to prevent removal of said tray from said projector after said other portion has been moved relative to said projector.

8. Apparatus for projecting slides comprising:
a slide projector, and
a slide tray including two relatively movable portions secured to one another as an assembled unit, said portions of said slide tray being mountable as an assembled unit on said projector for delivering the slides to be projected and being detachable from the projector as an assembled unit for removal and storage of the slides, said portions coacting to retain slides in said tray during storage, one of said portions of said tray having a passageway through which the slides are adapted to pass, one at a time, in coordination with relative movement of said portions, while others of the slides are held in said tray by said one portion, said projector including:
    a projection gate,
    means for fixedly holding said one portion relative to said projector with said passageway in register with said gate when said slide tray is mounted on said projector,
    indexing means adapted to move said other portion of said slide tray relative to said one fixedly held portion thereof for successively bringing slides in said slide tray one at a time into register with said passageway,
    means operating in timed relation with said indexing means for transporting each of the slides through said passageway and into and out of said projection gate for projection,
    said slide tray further comprising means connecting said two portions for releasably latching said portions against such relative movement, and
said projector further including means on said projector for releasing said latching means in response to engagement therewith when said tray is mounted on said slide projector.

9. The invention according to claim 8 wherein said latching means comprises a spring, a latch member biased by said spring, and said releasing means comprises a cam on said projector for urging said latch member against the bias of said spring for releasing said latching means.

10. Apparatus for projecting slides comprising:
a slide projector, and
a slide tray including two relatively movable portions secured to one another as an assembled unit, said portions of said slide tray being mountable as an assembled unit on said projector for delivering the slides to be projected and being detachable from the projector as an assembled unit for removal and storage of the slides, said portions coacting to retain slides in said tray during storage, one of said portions of said tray having a passageway through which the slides are adapted to pass, one at a time, in coordination with relative movement of said portions, while others of the slides are held in said tray by said one portion, said projector including:
    a projection gate,
    means for fixedly holding said one portion relative to said projector with said passageway in register with said gate when said slide tray is mounted on said projector,
    indexing means adapted to move said other portion of said slide tray relative to said one fixedly held portion thereof for successively bringing slides in said slide tray one at a time into register with said passageway, and
    means operating in timed relation with said indexing means for transporting each of the slides through said passageway and into and out of said projection gate for projection,
said indexing means comprising a movable pawl adapted to move said other portion relative to said fixed portion.

11. Apparatus for projecting slides comprising:
a slide projector, and
a slide tray including two relatively movable portions secured to one another as an assembled unit, said portions of said slide tray being mountable as an assembled unit on said projector for delivering the slides to be projected and being detachable from the projector as an assembled unit for removal and storage of the slides, said portions coacting to retain slides in said tray during storage, one of said portions of said tray having a passageway through which the slides are adapted to pass, one at a time, in coordination with relative movement of said portions, while others of the slides are held in said tray by said one portion, said projector including:
    a projection gate,
    means for fixedly holding said one portion relative to said projector with said passageway in register with said gate when said slide tray is mounted on said projector,
    indexing means adapted to move said other portion of said slide tray relative to said one fixedly held portion thereof for successively bringing slides in said slide tray one at a time into register with said passageway, and
    means operating in timed relation with said indexing means for transporting each of the slides through said passageway and into and out of said projection gate for projection,
said indexing means comprising a movable pawl adapted to move said other portion relative to said fixed portion, and further including means for reciprocally actuating said pawl in one direction, and means for selectively urging said pawl in one of two directions, different from said one direction, and corresponding to forward and reverse directions of said slide tray.

12. Apparatus for projecting slides comprising:
a slide projector, and
a slide tray including two relatively movable portions secured to one another as an assembled unit, said portions of said slide tray being mountable as an assembled unit on said projector for delivering the slides to be projected and being detachable from the projector as an assembled unit for removal and storage of the slides, said portions coacting to retain slides in said tray during storage, one of said portions of said tray having a passageway through which the slides are adapted to pass, one at a time, in coordination with relative movement of said portions, while at least one other slide is held in said tray by said one portion, said projector including:
    a projection gate,
    means for fixedly holding said one portion relative to said projector with said passageway in register with said gate when said slide tray is mounted on said projector,
    indexing means adapted to move said other portion of said slide tray relative to said one fixedly held portion thereof for successively bringing slides in said slide tray one at a time into register with said passageway, and
    means operating in timed relation with said indexing means for transporting each of the slides through said passageway and into and out of said projection gate for projection, said indexing means comprising a movable pawl adapted to move said other portion relative to said fixed portion, and further including means for reciprocally actuating said pawl in one direction, means for selectively urging said pawl in one of two directions, different from said one direction, and corresponding to forward and reverse directions of said slide tray, and control means for selectively controlling the direction in which said pawl is urged.

13. The invention according to claim 12 wherein said control means comprises an element connected to said pawl, and means for moving said element.

14. The invention according to claim 13 wherein said element comprises a spring, and said element moving means comprises a pivotal member connected to said spring.

15. The invention according to claim 14 wherein said element moving means further comprises a reciprocally movable member supporting said pivotal member, said spring comprises a wire having one end connected to said reciprocally movable member and its opposite end connected to said pawl, and said pivotal member is connected to said wire intermediate its ends.

16. The invention according to claim 15 wherein said element moving means further comprises a blocking member for said pivotal member and movable between first and second positions, and means on said pivotal member adapted upon movement of said reciprocally movable member to co-operate with said blocking member in each of said first and second positions for pivoting said pivotal member in one of two opposite directions.

17. The invention according to claim 16 wherein said means on said pivotal member comprises a pair of spaced projections, and said blocking member blocks one of said projections in one of said first and second positions and the other projection in the other of said first and second positions.

18. The invention according to claim 17 wherein said blocking member is pivotal and has an end portion for selectively blocking said projections, and said element moving means further comprises a second spring for biasing said blocking member in one of said first and second positions, and means for moving said blocking member in the other of said first and second positions against the bias of said second spring.

19. In a slide projector having a projection gate and being adapted to receive a slide tray having two relatively movable portions secured to one another as an assembled unit and co-operating to support a plurality of slides which are to be projected seriatim in said gate, the combination comprising:

indexing means for cyclically moving one of said portions of the slide try relative to said other portion and said gate, means for cyclically transferring successive slides between said one portion of the slide tray and said gate for projection, means for cyclically blocking movement of said one portion of the slide tray for positioning same, means for cyclically driving said indexing, transferring and blocking means in timed relation, clutch means for selectively connecting and disconnecting said driving means respectively to and from said indexing, transferring and blocking means, control means for said clutch means for selectively limiting said driving connection to a partial cycle of operation and a complete cycle of operation, and means responsive to operation of said clutch control means for partial cycle operation for disabling said indexing means when said driving connection is limited to a partial cycle of operation;

whereby said one portion of the slide tray may be manually moved relative to said other portion and said gate to select any slide in the tray for projection.

20. The invention according to claim 19 wherein said indexing means comprises a reciprocally movable member biased by a spring into engagement with a cam, and said disabling means moves said member out of engagement with said cam when said driving connection is limited to a partial cycle of operation.

21. The invention according to claim 20 wherein said member is movable in one direction, and said disabling means comprises a pivotal arm having a projection at one end adapted to engage an edge of said member and urge said member against the bias of said spring in a direction transverse to said one direction.

22. The invention in accordance with claim 1 wherein said means operating in timed relation with said indexing means for successively feeding and returning each of the slides substantially vertically through the passageway and between the slide tray and said projection gate comprises a member adapted to underlie and support the lower portion of each of the slides when the slides are being successively fed and returned, and means for successively raising and lowering said member along a path of travel extending substantially vertically from adjacent the passageway to adjacent said projection gate.

23. The invention in accordance with claim 1 wherein said means operating in timed relation with said indexing means for successively feeding and returning each of the slides substantially vertically through the passageway and between the slide tray and said projection gate comprises a member having an upper surface adapted to underlie and engage the lower portion of each of the slides when the slides are being successively fed and returned, said member being proportioned to enter into the passageway, and means for successively raising and lowering said member along a path of travel extending substantially vertically from an upward position in which said upper surface of said member is in the passageway and immediately above the upper surface of the one portion of the slide tray adjacent the passageway to a downward position in which the slide is lowered to adjacent said projection gate, whereby said upper surface of said member when in the upward position thereof can support each of the slides as they are being moved into and out of registry with the passageway.

24. The invention in accordance with claim 2 wherein said means operating in timed relation with said indexing means for successively feeding and returning each of the slides substantially vertically through said passageway and between said slide tray and said projection gate comprises a member adapted to underlie and support the lower portion of each of the slides when the slides are being successively fed and returned, and means for successively raising and lowering said member along a path of travel extending substantially vertically from adjacent said passageway to adjacent said projection gate.

25. The invention in accordance with claim 2 wherein said means operating in timed relation with said indexing means for successively feeding and returning each of the slides substantially vertically through said passageway and between said slide tray and said projection gate comprises a member having an upper surface adapted to underlie and support the lower portion of each of the slides when the slides are being successively fed and returned, said member being proportioned to enter into said passageway, and means for successively raising and lowering said member along a path of travel extending substantially vertically from an upward position in which said upper surface of said member is in said passageway and immediately above the upper surface of the one portion of said slide tray adjacent said passageway to a downward position in which the slide is lowered to adjacent said projection gate, whereby said upper surface of said member when in the upward position thereof can support each of the slides as they are being moved into and out of registry with said passageway.

References Cited by the Examiner
UNITED STATES PATENTS

| | | | |
|---|---|---|---|
| 1,328,192 | 1/1920 | Pflaster | 88—27 |
| 1,768,111 | 6/1930 | Branger | 88—27 |
| 2,146,452 | 2/1939 | Spindler | 88—27 |
| 2,221,753 | 11/1940 | Bodie | 88—27 |
| 2,375,706 | 5/1945 | Stechbart et al. | 88—28 |
| 2,748,653 | 6/1956 | Pollan et al. | 88—28 |
| 2,843,951 | 7/1958 | Richards | 40—36 |
| 2,854,888 | 10/1958 | Kaye | 88—28 |
| 3,059,360 | 10/1962 | Krauskopf | 88—28 |
| 3,146,666 | 9/1964 | Misuraca | 88—28 |
| 3,173,331 | 3/1965 | Danner | 88—28 |

NORTON ANSHER, *Primary Examiner.*

JOHN M. HORAN, *Examiner.*

H. H. FLANDERS, *Assistant Examiner.*

UNITED STATES PATENT OFFICE
CERTIFICATE OF CORRECTION

Patent No. 3,276,314　　　　　　　　　　　　　　　October 4, 1966

Herbert T. Robinson

It is hereby certified that error appears in the above numbered patent requiring correction and that the said Letters Patent should read as corrected below.

Column 7, line 45, for "86" read -- 186 --; column 9, line 53, for "projecting" read -- projection --; column 9, line 62, for "322" read -- 332 --; column 10, line 74, for "plates" read -- plate --; column 12, line 46, strike out "a", second occurrence; line 51, for "of" read -- for --; column 13, line 49, for "and" read -- said --.

Signed and sealed this 5th day of September 1967.

(SEAL)
Attest:

ERNEST W. SWIDER
Attesting Officer

EDWARD J. BRENNER
Commissioner of Patents